US008323098B2

(12) United States Patent
Okada

(10) Patent No.: US 8,323,098 B2
(45) Date of Patent: Dec. 4, 2012

(54) GAMING MACHINE AND GAME SYSTEM

(75) Inventor: Kazuo Okada, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 768 days.

(21) Appl. No.: 11/296,639

(22) Filed: Dec. 8, 2005

(65) Prior Publication Data

US 2006/0128461 A1 Jun. 15, 2006

(30) Foreign Application Priority Data

Dec. 10, 2004 (JP) ................................ 2004-358153
Dec. 10, 2004 (JP) ................................ 2004-358206
Dec. 14, 2004 (JP) ................................ 2004-361553
Dec. 21, 2004 (JP) ................................ 2004-369248
Jul. 22, 2005 (JP) ................................ 2005-213181

(51) Int. Cl.
*A63F 9/24* (2006.01)
*A63F 13/00* (2006.01)
*G06F 17/00* (2006.01)
*G06F 19/00* (2011.01)

(52) U.S. Cl. ........................................... 463/25; 463/16

(58) Field of Classification Search .............. 463/25–27, 463/21
See application file for complete search history.

(56) References Cited

U.S. PATENT DOCUMENTS 4,657,256 A * 4/1987 Okada ............................ 463/21
4,669,731 A * 6/1987 Clarke ........................... 463/20
5,178,390 A * 1/1993 Okada ...................... 273/143 R
5,833,538 A * 11/1998 Weiss ............................ 463/21
6,077,162 A 6/2000 Weiss
6,113,493 A * 9/2000 Walker et al. .................. 463/25
6,159,098 A 12/2000 Slomiany et al.
6,206,782 B1 3/2001 Walker et al.
6,500,068 B2 * 12/2002 Walker et al. .................. 463/25
6,739,973 B1 * 5/2004 Lucchesi et al. ................ 463/35
2001/0008843 A1 * 7/2001 Walker et al. .................. 463/16
2002/0052233 A1 * 5/2002 Gauselmann .................. 463/20
2003/0073487 A1 4/2003 Okada
2003/0119585 A1 6/2003 Walker et al.
2003/0139214 A1 * 7/2003 Wolf et al. ...................... 463/42
2003/0220138 A1 11/2003 Walker et al.
2004/0014522 A1 * 1/2004 Walker et al. .................. 463/25
2004/0185933 A1 * 9/2004 Nicely ........................... 463/25
2005/0107164 A1 * 5/2005 Muir et al. ...................... 463/42
2005/0153768 A1 * 7/2005 Paulsen .......................... 463/16

FOREIGN PATENT DOCUMENTS

JP 4-244178 9/1992
JP 2003-117070 4/2003

* cited by examiner

*Primary Examiner* — Michael Cuff
*Assistant Examiner* — Kevin Y Kim
(74) *Attorney, Agent, or Firm* — KMF Patent Services, PLLC; Kenneth M. Fagin, Esq.

(57) ABSTRACT

A gaming machine includes an operation unit that is operated by a player, a game mode switching unit that switches a game mode, and a game control unit that controls a game based on the game mode. The game mode switching unit switches, based on the operation via the operation unit, a game mode between an insured mode where a compensation function works to compensate for a loss and an uninsured mode where the compensation function does not work.

12 Claims, 40 Drawing Sheets

FIG. 5

111

| FIRST REEL BAND | |
|---|---|
| CODE NUMBER | SYMBOL |
| 00 | J |
| 01 | Q |
| 02 | LOBSTER |
| 03 | J |
| 04 | Q |
| 05 | CRAB |
| 06 | A |
| 07 | WORM |
| 08 | K |
| 09 | FISH |
| 10 | PUNK |
| 11 | Q |
| 12 | SHARK |
| 13 | WILD |
| 14 | K |
| 15 | A |
| 16 | OCTOPUS |
| 17 | J |
| 18 | Q |
| 19 | FISH |
| 20 | K |
| 21 | J |
| 22 | SARDINE |
| 23 | CRAB |
| 24 | WILD |
| 25 | WORM |
| 26 | Q |
| 27 | CRAB |
| 28 | A |
| 29 | FISH |

112

| SECOND REEL BAND | |
|---|---|
| CODE NUMBER | SYMBOL |
| 00 | OCTOPUS |
| 01 | A |
| 02 | LOBSTER |
| 03 | OCTOPUS |
| 04 | K |
| 05 | WILD |
| 06 | FISH |
| 07 | WORM |
| 08 | J |
| 09 | CRAB |
| 10 | OCTOPUS |
| 11 | A |
| 12 | SARDINE |
| 13 | WORM |
| 14 | J |
| 15 | OCTOPUS |
| 16 | SHARK |
| 17 | J |
| 18 | OCTOPUS |
| 19 | CRAB |
| 20 | Q |
| 21 | PUNK |
| 22 | CRAB |
| 23 | WILD |
| 24 | J |
| 25 | WORM |
| 26 | CRAB |
| 27 | K |
| 28 | OCTOPUS |
| 29 | WORM |

113

| THIRD REEL BAND | |
|---|---|
| CODE NUMBER | SYMBOL |
| 00 | A |
| 01 | K |
| 02 | LOBSTER |
| 03 | WORM |
| 04 | Q |
| 05 | LOBSTER |
| 06 | PUNK |
| 07 | A |
| 08 | J |
| 09 | SARDINE |
| 10 | WILD |
| 11 | Q |
| 12 | WORM |
| 13 | K |
| 14 | FISH |
| 15 | Q |
| 16 | CRAB |
| 17 | A |
| 18 | WILD |
| 19 | SHARK |
| 20 | Q |
| 21 | K |
| 22 | OCTOPUS |
| 23 | Q |
| 24 | A |
| 25 | WORM |
| 26 | J |
| 27 | Q |
| 28 | PUNK |
| 29 | K |

114

| FOURTH REEL BAND | |
|---|---|
| CODE NUMBER | SYMBOL |
| 00 | Q |
| 01 | J |
| 02 | LOBSTER |
| 03 | Q |
| 04 | WILD |
| 05 | LOBSTER |
| 06 | A |
| 07 | K |
| 08 | SARDINE |
| 09 | A |
| 10 | K |
| 11 | CRAB |
| 12 | PUNK |
| 13 | K |
| 14 | SHARK |
| 15 | WORM |
| 16 | A |
| 17 | OCTOPUS |
| 18 | FISH |
| 19 | K |
| 20 | WILD |
| 21 | PUNK |
| 22 | A |
| 23 | FISH |
| 24 | CRAB |
| 25 | K |
| 26 | Q |
| 27 | OCTOPUS |
| 28 | WORM |
| 29 | Q |

115

| FIFTH REEL BAND | |
|---|---|
| CODE NUMBER | SYMBOL |
| 00 | J |
| 01 | A |
| 02 | LOBSTER |
| 03 | J |
| 04 | A |
| 05 | FISH |
| 06 | CRAB |
| 07 | PUNK |
| 08 | K |
| 09 | SARDINE |
| 10 | Q |
| 11 | CRAB |
| 12 | K |
| 13 | WORM |
| 14 | FISH |
| 15 | WILD |
| 16 | OCTOPUS |
| 17 | Q |
| 18 | WORM |
| 19 | J |
| 20 | Q |
| 21 | OCTOPUS |
| 22 | A |
| 23 | PUNK |
| 24 | WORM |
| 25 | Q |
| 26 | CRAB |
| 27 | WILD |
| 28 | K |
| 29 | OCTOPUS |

FIG. 9

| | 2K | 3K | 4K | 5K | |
|---|---|---|---|---|---|
| LOBSTER | 10 | 320 | 2500 | 6000 | Left→Right |
| SHARK | 3 | 25 | 150 | 1000 | Left→Right |
| FISH | 2 | 15 | 120 | 500 | Left→Right |
| PUNK | 2 | 10 | 120 | 400 | Left→Right |
| OCTOPUS | 2 | 8 | 50 | 300 | Left→Right |
| CRAB | | 7 | 50 | 200 | Left→Right |
| WORM | | 6 | 40 | 150 | Left→Right |
| A | | 5 | 25 | 120 | Left→Right |
| K | | 5 | 25 | 120 | Left→Right |
| Q | | 5 | 20 | 100 | Left→Right |
| J | | 5 | 20 | 100 | Left→Right |
| SARDINE | 2 | 5 | 10 | 125 | SCATTER/Trigger |

101

| WINNING COMBINATION | RANDOM NUMBER |
|---|---|
| BONUS GAME | 0~49 |
| LOBSTER×5 | 50~51 |
| SHARK×5 | 52~57 |
| FISH×5 | 58~97 |
| PUNK×5 | 98~177 |
| OCTOPUS×5 | 178~277 |
| CRAB×5 | 278~477 |
| WORM×5 | 478~777 |
| A×5 | 778~1177 |
| K×5 | 1178~1577 |
| Q×5 | 1578~1977 |
| J×5 | 1978~2377 |
| SARDINE×3 | 2378~2577 |
| MISS | 2578~11999 |

FIG. 22A

MYSTERY BONUS GAME WINNING COMBINATION IN UNINSURED MODE

| | |
|---|---|
| PATTERN A | LOBSTER–FISH–CRAB–SHARK–any |
| PATTERN B | OCTOPUS–PUNK–WORM–A–any |
| PATTERN C | A–K–Q–J–any |

FIG. 22B

MYSTERY BONUS GAME WINNING COMBINATION IN INSURED MODE

| | |
|---|---|
| PATTERN D | LOBSTER–FISH–CRAB–any–any |
| PATTERN E | OCTOPUS–PUNK–WORM–any–any |
| PATTERN F | A–K–Q–any–any |

FIG. 26A

MYSTERY BONUS GAME LOTTERY TABLE USED IN UNINSURED MODE

| LOTTERY RESULT | RANDOM NUMBER |
| --- | --- |
| WIN | 0~1 |
| MISS | 2~49 |

FIG. 26B

MYSTERY BONUS GAME LOTTERY TABLE USED IN INSURED MODE

| LOTTERY RESULT | RANDOM NUMBER |
| --- | --- |
| WIN | 0~3 |
| MISS | 4~49 |

FIG. 28

116

| SIXTH REEL BAND | |
|---|---|
| CODE NUMBER | SYMBOL |
| 00 | J |
| 01 | Q |
| 02 | LOBSTER |
| 03 | WILD |
| 04 | Q |
| 05 | CRAB |
| 06 | A |
| 07 | WORM |
| 08 | K |
| 09 | FISH |
| 10 | PUNK |
| 11 | Q |
| 12 | SHARK |
| 13 | WILD |
| 14 | K |
| 15 | A |
| 16 | OCTOPUS |
| 17 | SARDINE |
| 18 | Q |
| 19 | WILD |
| 20 | K |
| 21 | J |
| 22 | SARDINE |
| 23 | CRAB |
| 24 | WILD |
| 25 | WORM |
| 26 | Q |
| 27 | SARDINE |
| 28 | A |
| 29 | FISH |

117

| SEVENTH REEL BAND | |
|---|---|
| CODE NUMBER | SYMBOL |
| 00 | J |
| 01 | WILD |
| 02 | LOBSTER |
| 03 | WILD |
| 04 | Q |
| 05 | SARDINE |
| 06 | A |
| 07 | WORM |
| 08 | WILD |
| 09 | FISH |
| 10 | PUNK |
| 11 | Q |
| 12 | SHARK |
| 13 | WILD |
| 14 | K |
| 15 | WILD |
| 16 | OCTOPUS |
| 17 | SARDINE |
| 18 | Q |
| 19 | WILD |
| 20 | K |
| 21 | WILD |
| 22 | SARDINE |
| 23 | CRAB |
| 24 | WILD |
| 25 | SARDINE |
| 26 | Q |
| 27 | SARDINE |
| 28 | A |
| 29 | FISH |

FIG. 30

INSURED MODE

104

| WINNING COMBINATION | RANDOM NUMBER |
|---|---|
| BONUS GAME TRIGGER | 0~74 |
| LOBSTER × 5 | 75~77 |
| SHARK × 5 | 78~86 |
| FISH × 5 | 87~146 |
| PUNK × 5 | 147~266 |
| OCTOPUS × 5 | 267~416 |
| CRAB × 5 | 417~716 |
| WORM × 5 | 717~1016 |
| A × 5 | 1017~1616 |
| K × 5 | 1617~2216 |
| Q × 5 | 2217~2816 |
| J × 5 | 2817~3416 |
| SARDINE × 3 | 3417~3616 |
| MISS | 3617~11999 |

FIG. 31

MYSTERY BONUS GAME WINNING COMBINATION IN SPECIAL MODE

| | |
|---|---|
| PATTERN G | LOBSTER−FISH−any−any−any |
| PATTERN H | OCTOPUS−PUNK−any−any−any |
| PATTERN I | A−K−any−any−any |

FIG. 34

MYSTERY BONUS GAME LOTTERY TABLE
USED IN SPECIAL MODE

| LOTTERY RESULT | RANDOM NUMBER |
| --- | --- |
| WIN | 0~9 |
| MISS | 10~49 |

GAMING MACHINE AND GAME SYSTEM

CROSS REFERENCE TO RELATED APPLICATION

This application is based upon and claims the benefit of priority from the prior Japanese Patent Applications No. 2004-358153, filed on Dec. 10, 2004, No. 2004-358206, filed on Dec. 10, 2004, No. 2004-361553, filed on Dec. 14, 2004, No. 2004-369248, filed on Dec. 21, 2004, and No. 2005-213181, filed on Jul. 22, 2005, the entire contents of which are incorporated herein by reference.

BACKGROUND OF THE INVENTION

1. Field of the Invention

The present invention relates to a gaming machine such as a slot machine, a pachi-slot machine, and a pachinko machine, and also relates to a game system including a gaming machine and a server that is connected in communication with the gaming machine.

2. Description of Related Art

In a gaming machine such as a slot machine and a card game machine, when a game medium such as a coin is inserted into the gaming machine to start a game, an internal lottery is performed, and the game result is displayed based on the result of that internal lottery. For example, in a slot machine, a symbol determined by the internal lottery is stopped and displayed on a reel, and in a card game machine, a card of specified type determined by the internal lottery is displayed. Then, based on the game result, a predetermined number of game media are paid out.

In such a gaming machine, a probability of offering an advantageous game result to a player, e.g., the probability of a win on a pay line, is set to a predetermined value. In this case, the winning probability converges at a predetermined value, for example, a payout rate is 80%, after quite a few games are performed. This causes problems in which many game media are obtained even though few game media are spent, and in which only a few game media are obtained even though a great number of game media are spent. Therefore, gambling orientation is increased to add amusingness to games, whereas a player loses expectations for games when it is difficult to obtain the advantageous game result, which can cause a game shop having such a gaming machine to lose customers.

In order to prevent a player from losing expectations for games, various techniques are proposed. For example, there is a technique to automatically conduct a payback system in which game media such as inserted coins are partially preserved to pay back afterward (see JP-A-2003-117070). According to the payback system, when the amount of lost credits equal to or more than an upper limit, the preserved game media are offered to a player. Furthermore, there is a technique in which an additional coin insertion slot for insurance is provided, and three insurance coins are inserted thereto to apply an insurance function. When a predetermined number of coins are inserted into a gaming machine during a game, insurance coins are paid out (see JP-A-4-244178).

SUMMARY OF THE INVENTION

However, according to the former of the two techniques, regardless of player's intention, inserted game media are partially reserved for payback, and therefore, the player can expect to have a payback. However, since relatively many game media are required for payback, some players desire to play games without utilizing the payback system. The payback system functions without consideration for such the player's intention, which can reduce the player's willingness for games. According to the latter's technique, once the insurance function starts to work, it is continuously working for a predetermined time period regardless of the player's intention. However, it is sometimes advantageous without the insurance function, depending on game conditions. Operating the insurance function even in such a case, without consideration for the player's intention, can also reduce the player's willingness for games.

It is an object of the present invention to provide a gaming machine and a game system, in which a compensation function is provided that compensates for a loss due to games to prevent a reduction in player's expectations for games, and the compensation function is stopped in accordance with player's intention to increase player's satisfaction.

According to an aspect of the invention, there is provided a gaming machine including: a receiving unit that receives a game medium; an exchange unit that exchanges the game medium received by the receiving unit to a game value to be used in a game; a payout unit that pays out a predetermined value of the game medium based on the game value exchanged by the exchange unit and on a game result; an operation unit that can be operated by a player; a game mode switching unit that switches, based on the operation via the operation unit, a game mode between an insured mode where a compensation function works to compensate for a loss and an uninsured mode where the compensation function does not work; and a game control unit that controls a game based on the game mode.

In the aspect, based on the operation of the operation unit by a player, the game mode is switched between the insured mode where the compensation function works and the uninsured mode where the compensation function does not work. In other words, a player can select whether or not to apply the compensation function by his/her intention. Thus, player's satisfaction can be increased.

BRIEF DESCRIPTION OF THE DRAWINGS other and further objects, features and advantages of the invention will appear more fully from the following description taken in connection with the accompanying drawings in which:

FIG. 5 illustrates symbol columns variably displayed on the video reels;

FIG. 9 illustrates a table showing winning combinations and payout numbers thereof;

FIGS. 22A and 22B illustrate mystery bonus game winning combinations in an uninsured mode and an insured mode, respectively;

FIGS. 26A and 26B illustrate mystery bonus game lottery tables used in the uninsured mode and the insured mode, respectively, in the second embodiment;

Figure 27A:
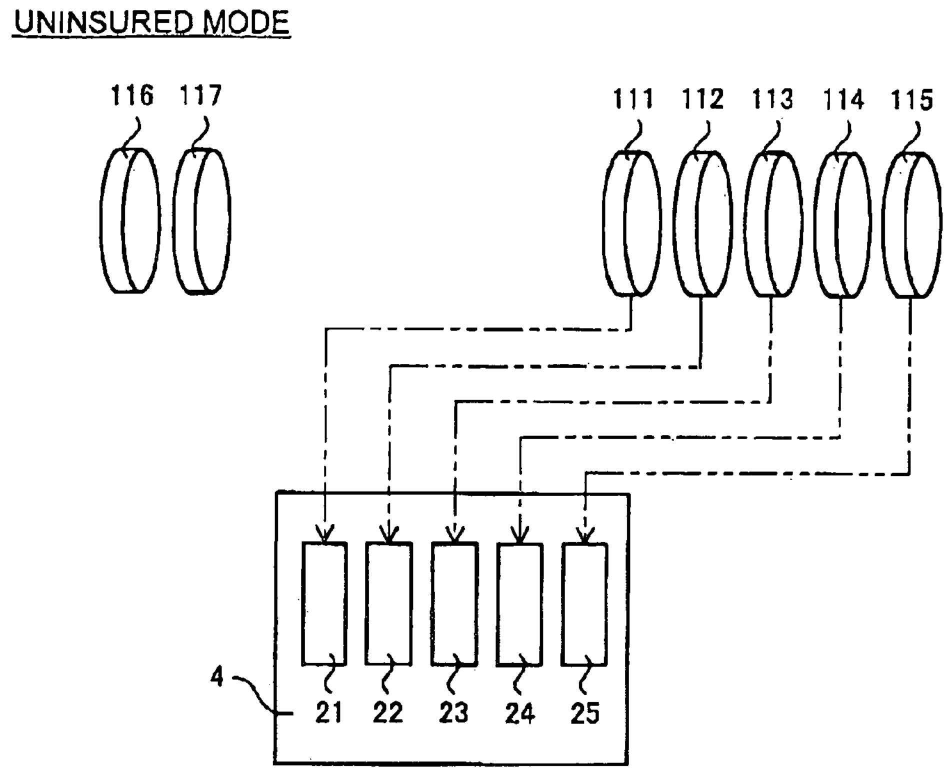
Figure 27B:
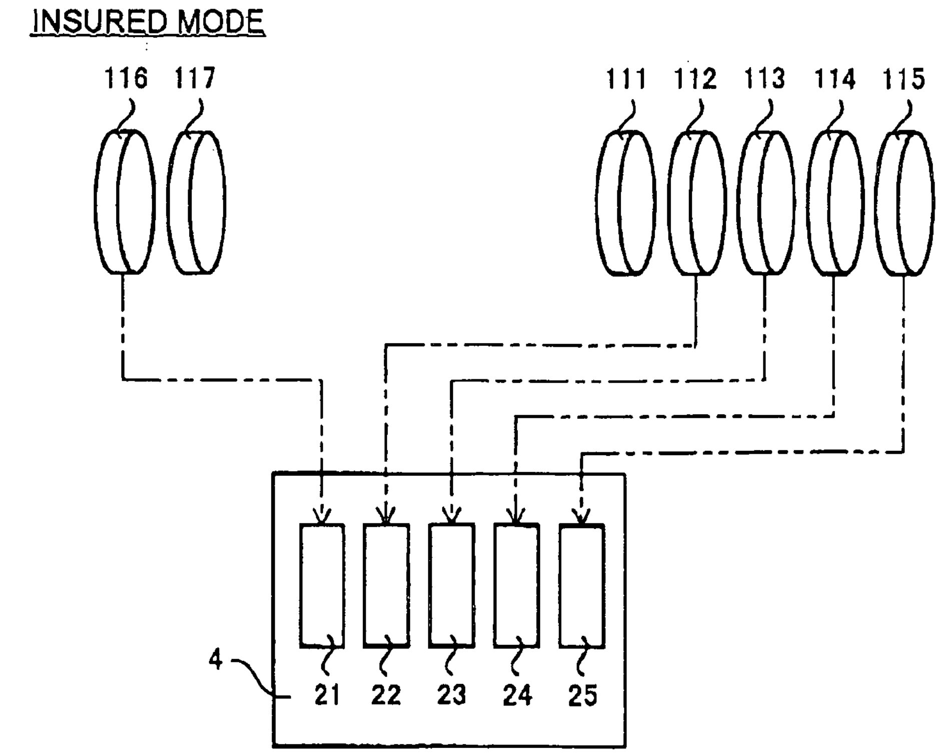
Figure 27C:
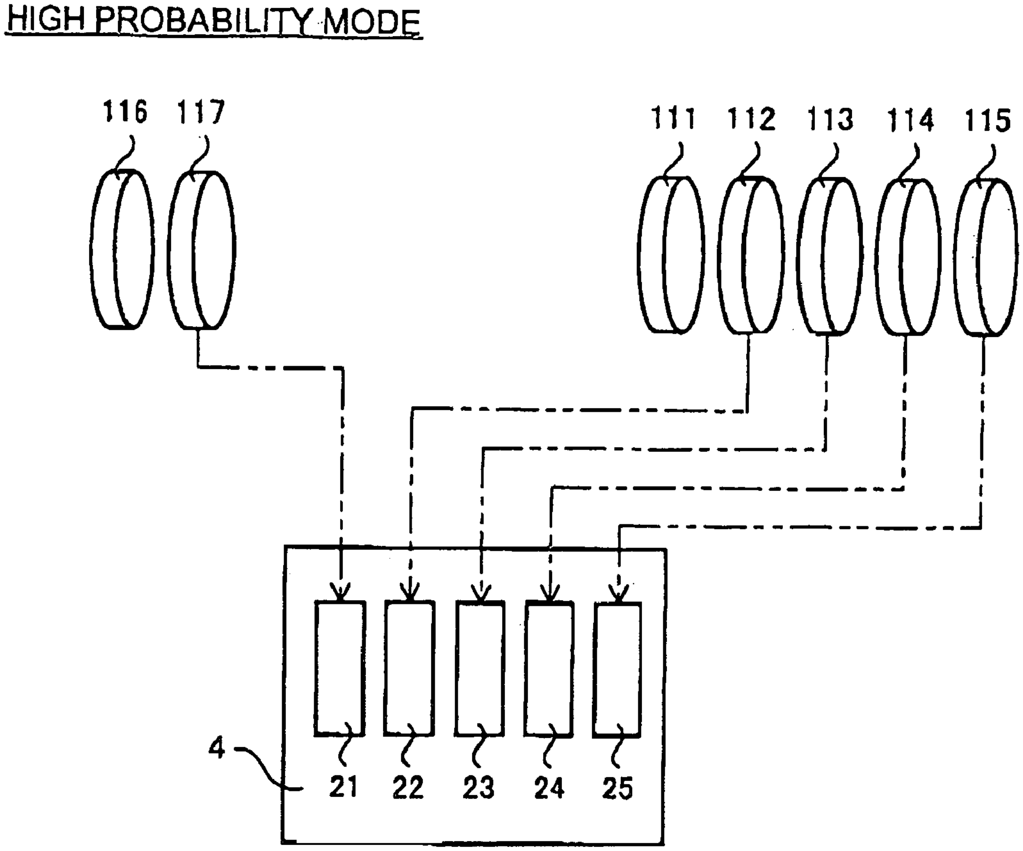
Figure 29:
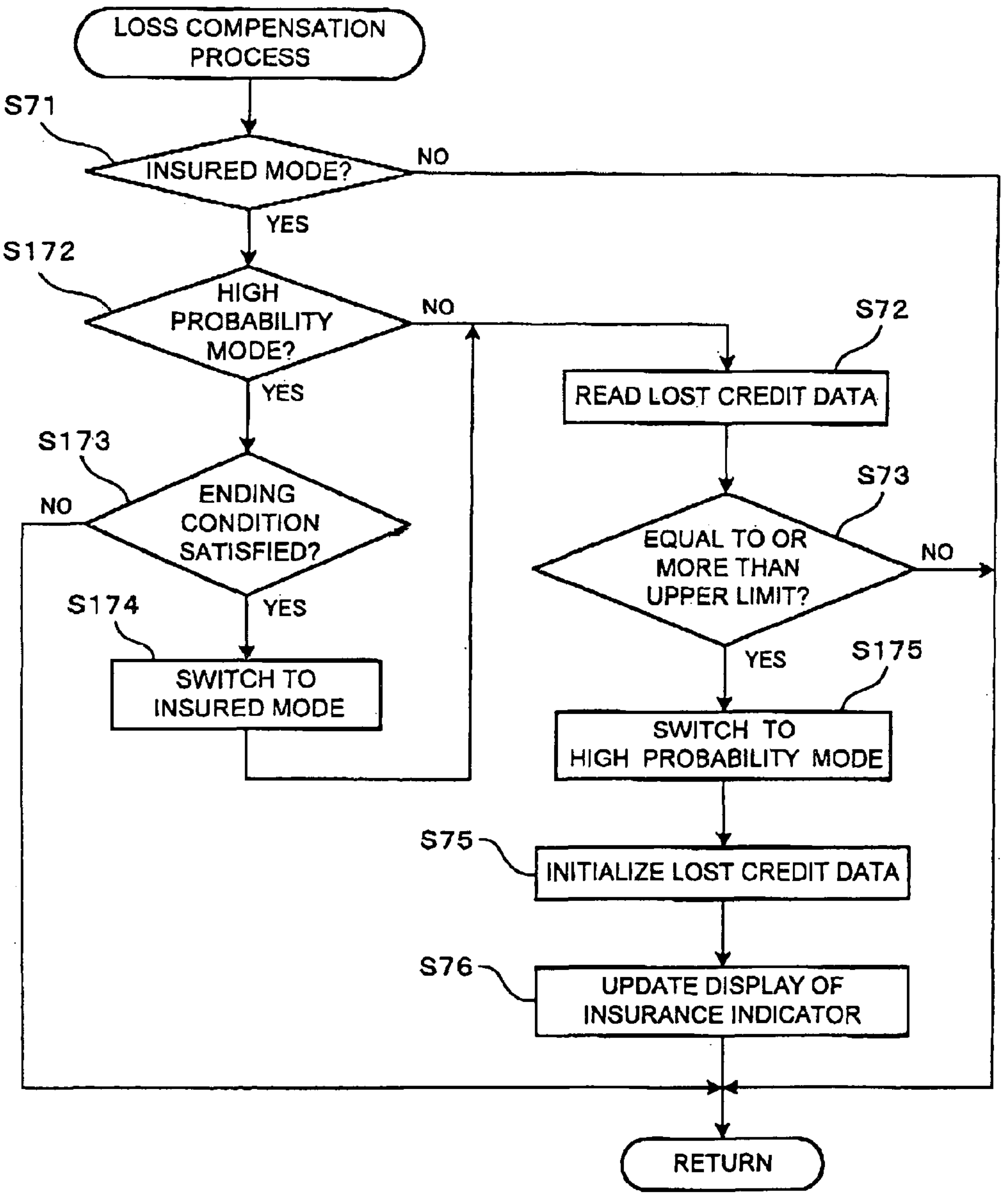
Figure 32:
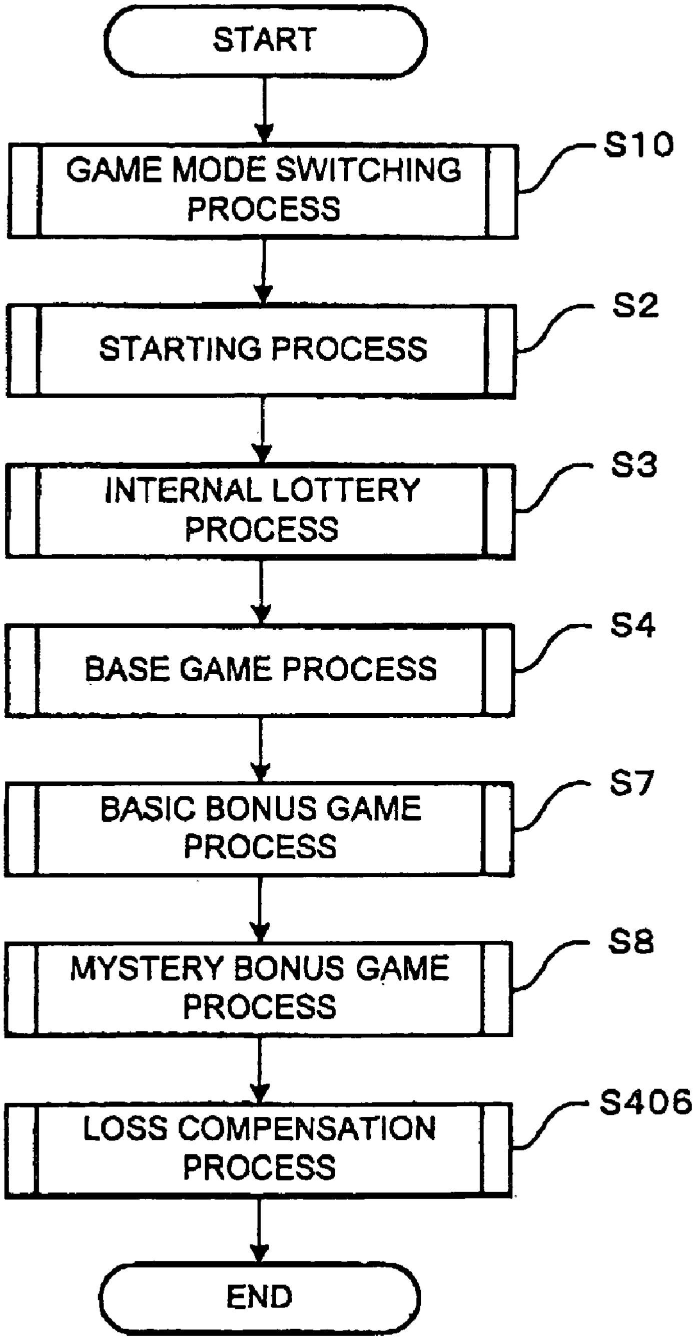
Figure 33:
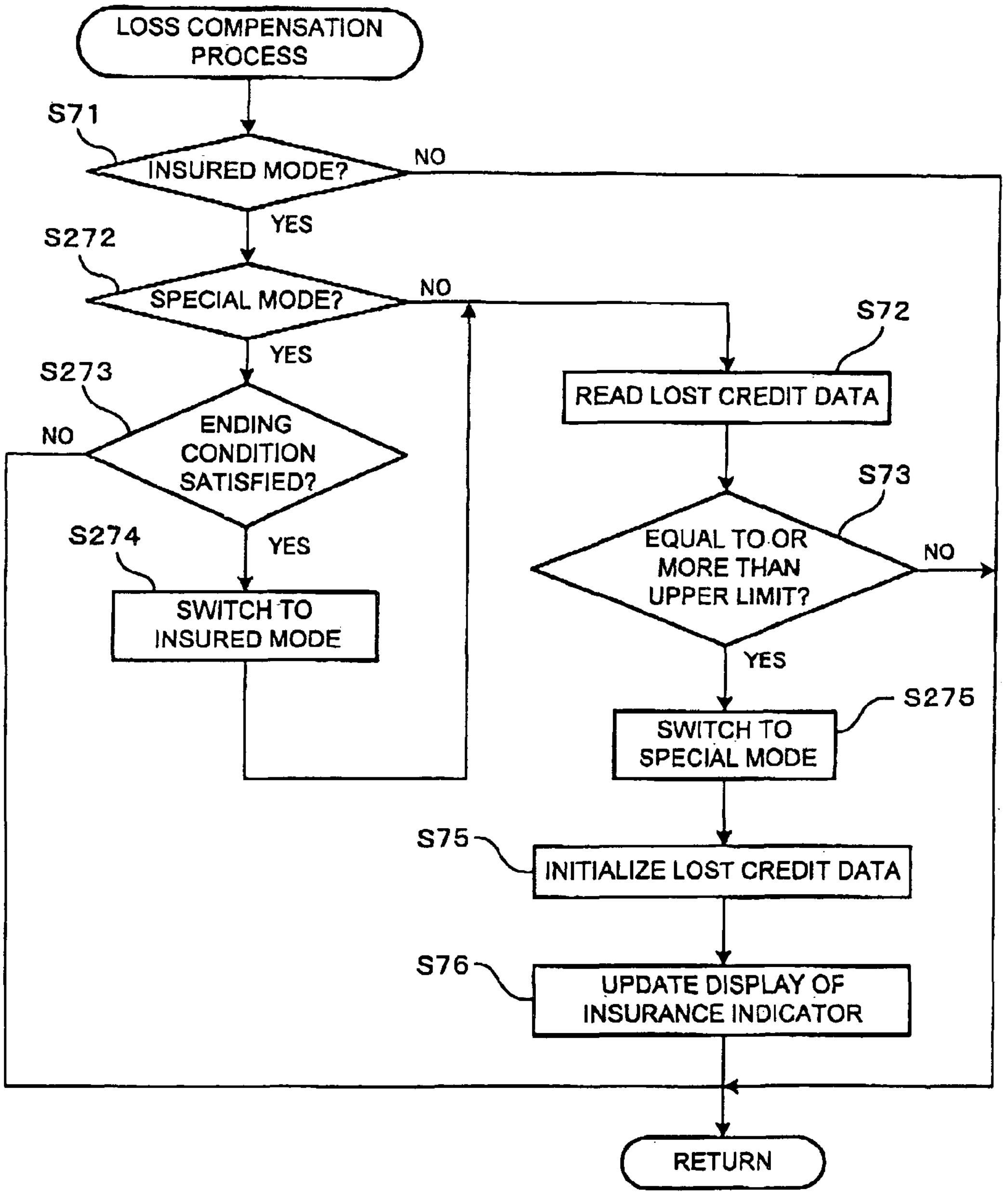
Figure 35:
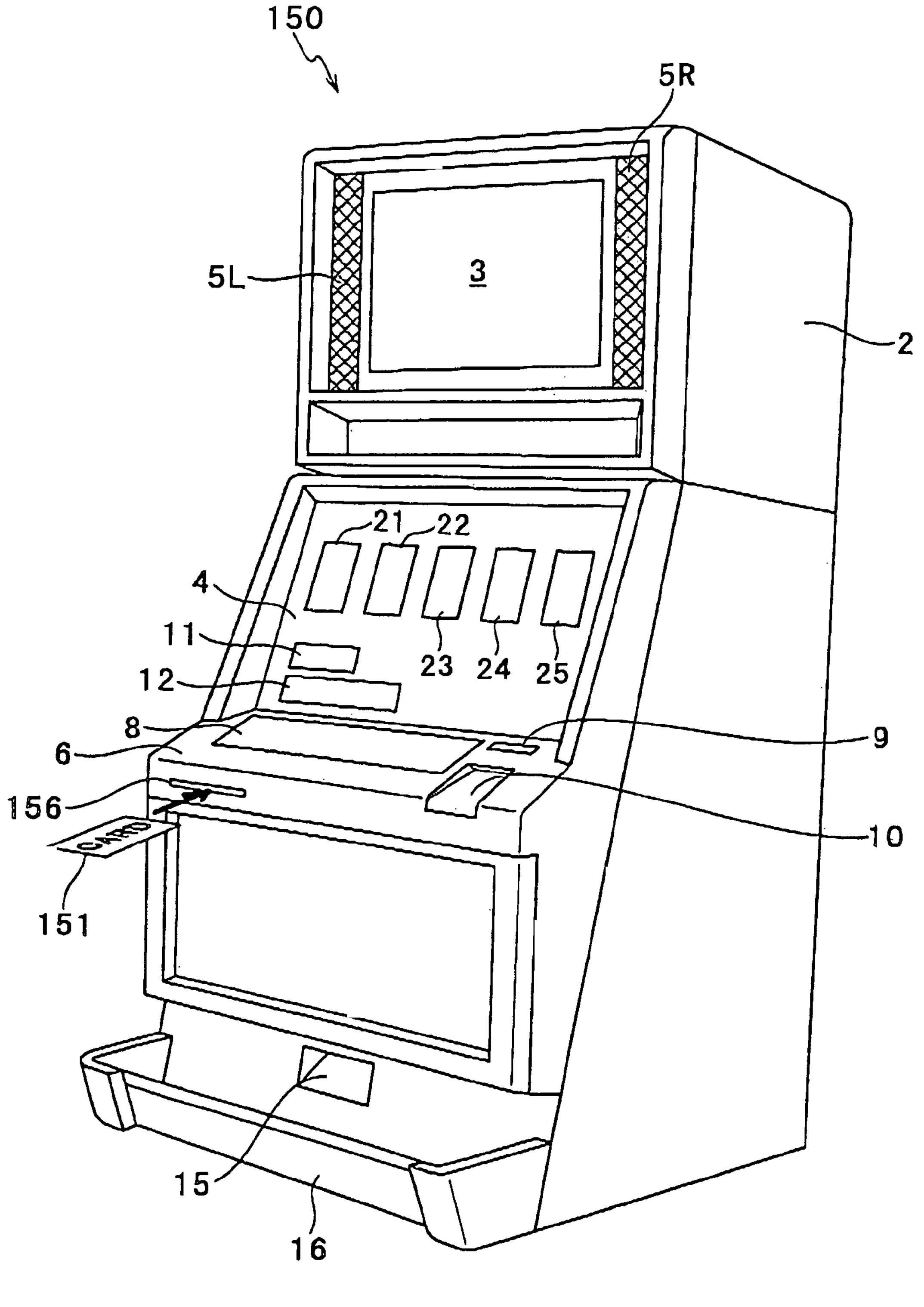
Figure 36:
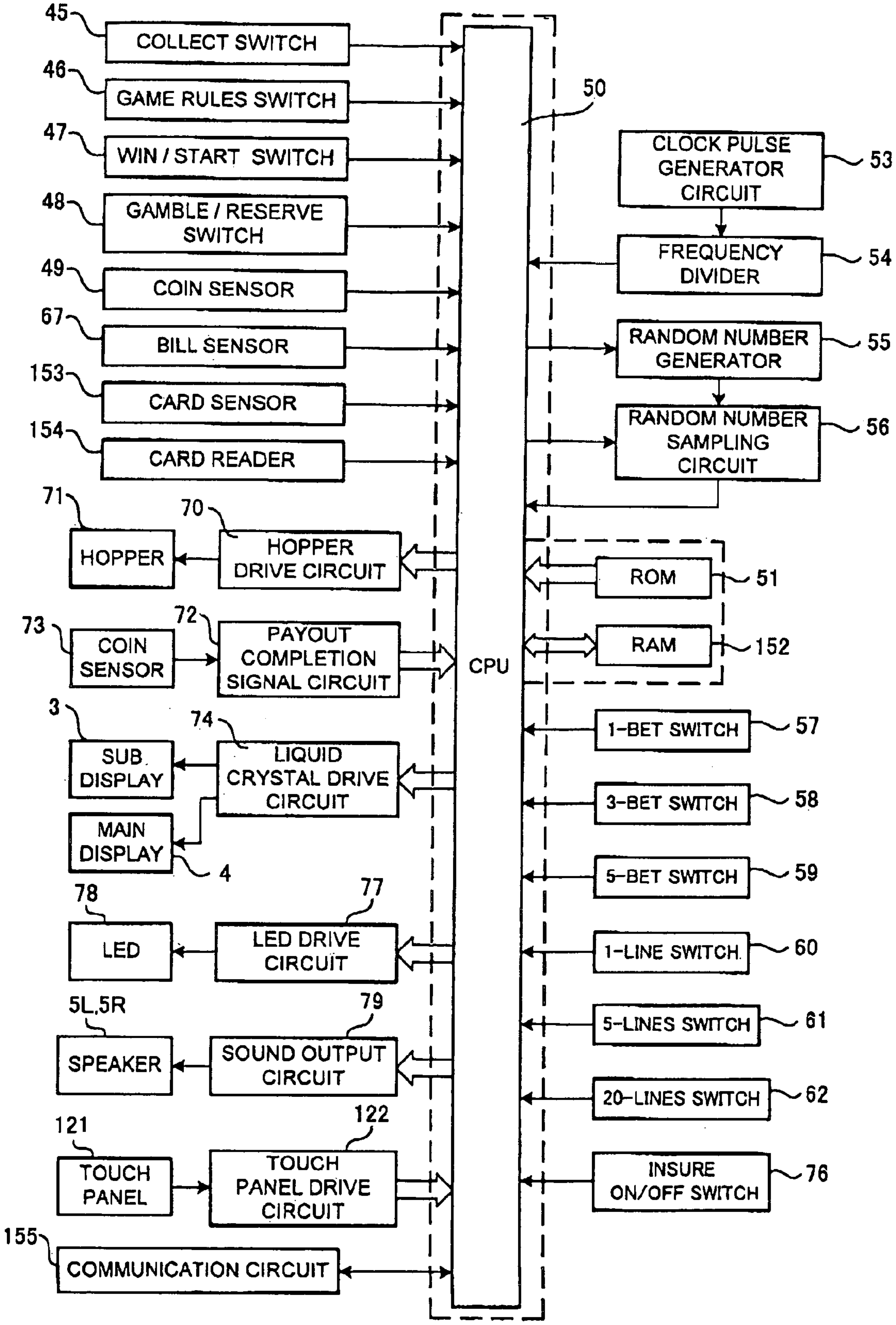
Figure 37:
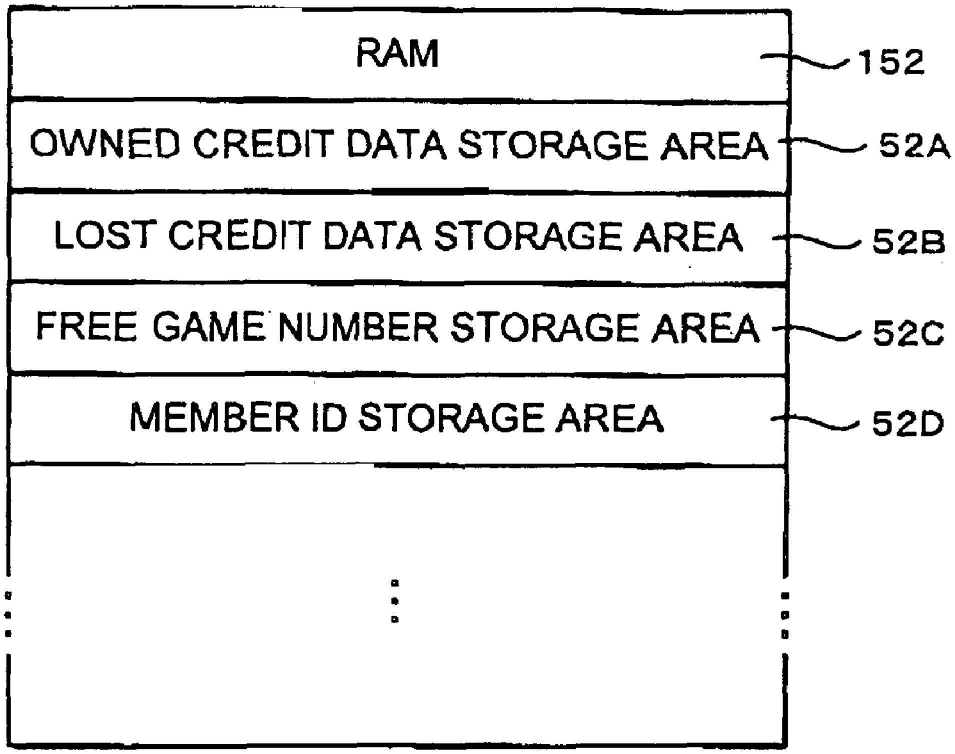
Figure 38:
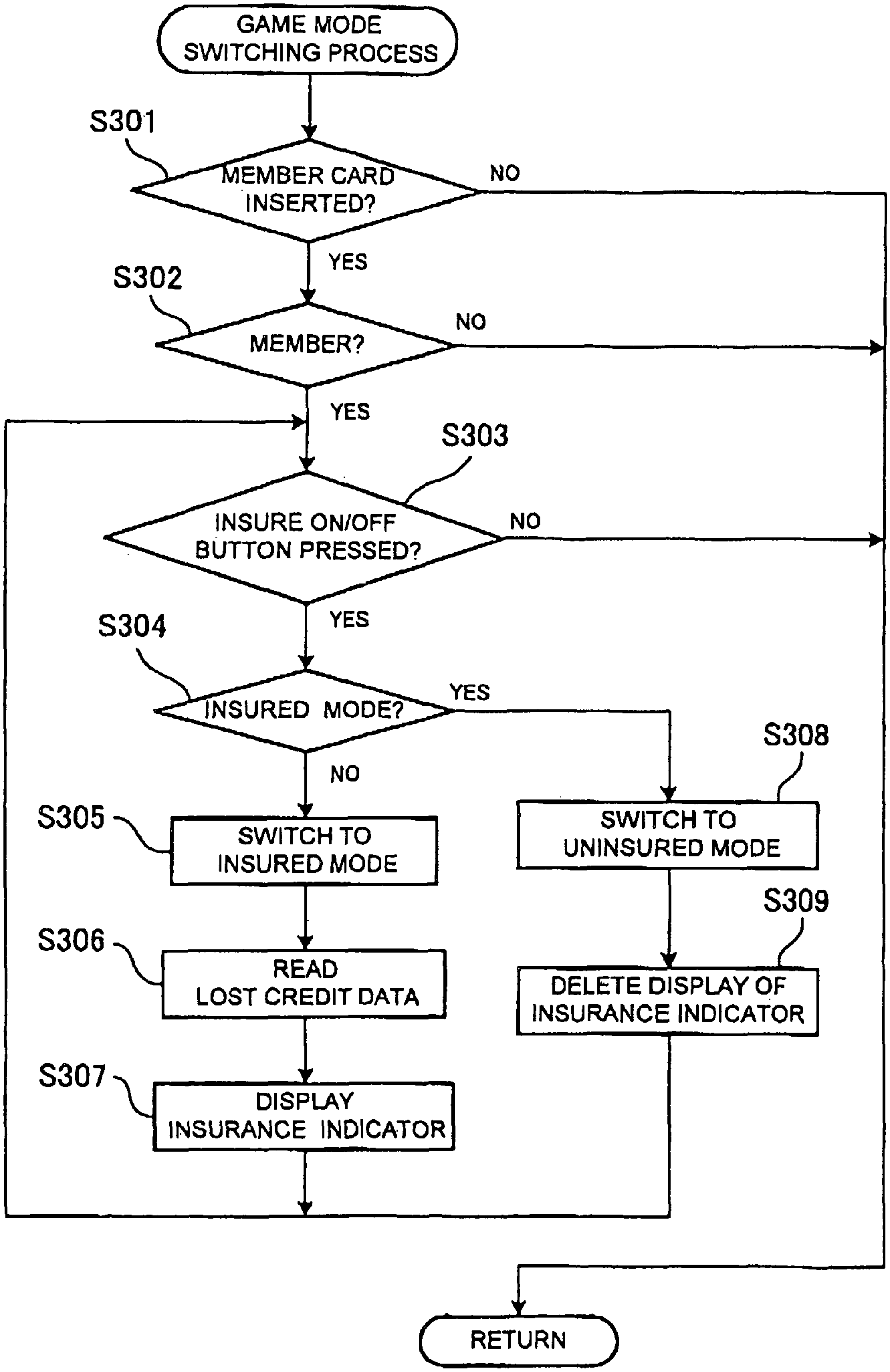
Figure 39:
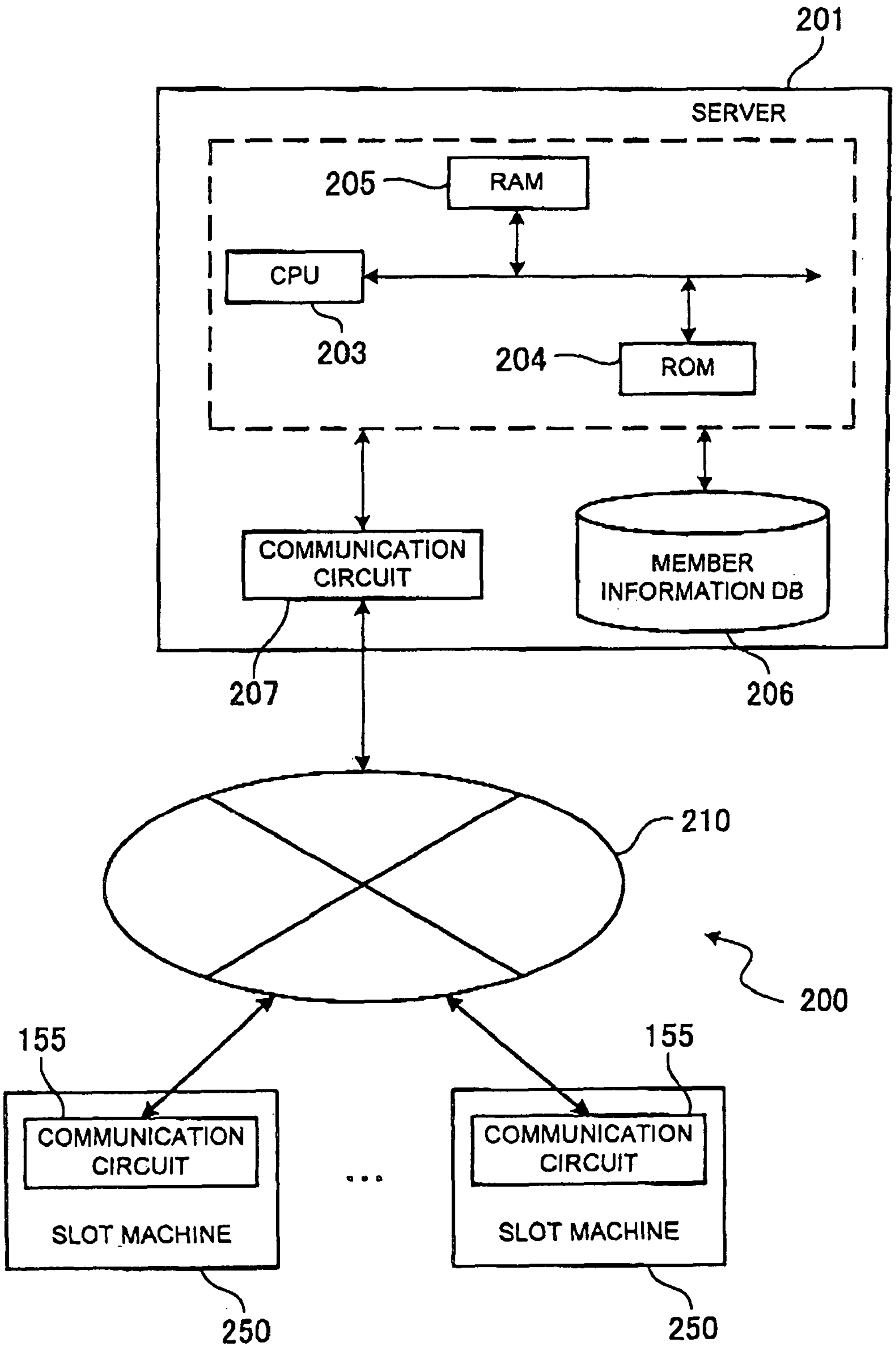
Figure 40:
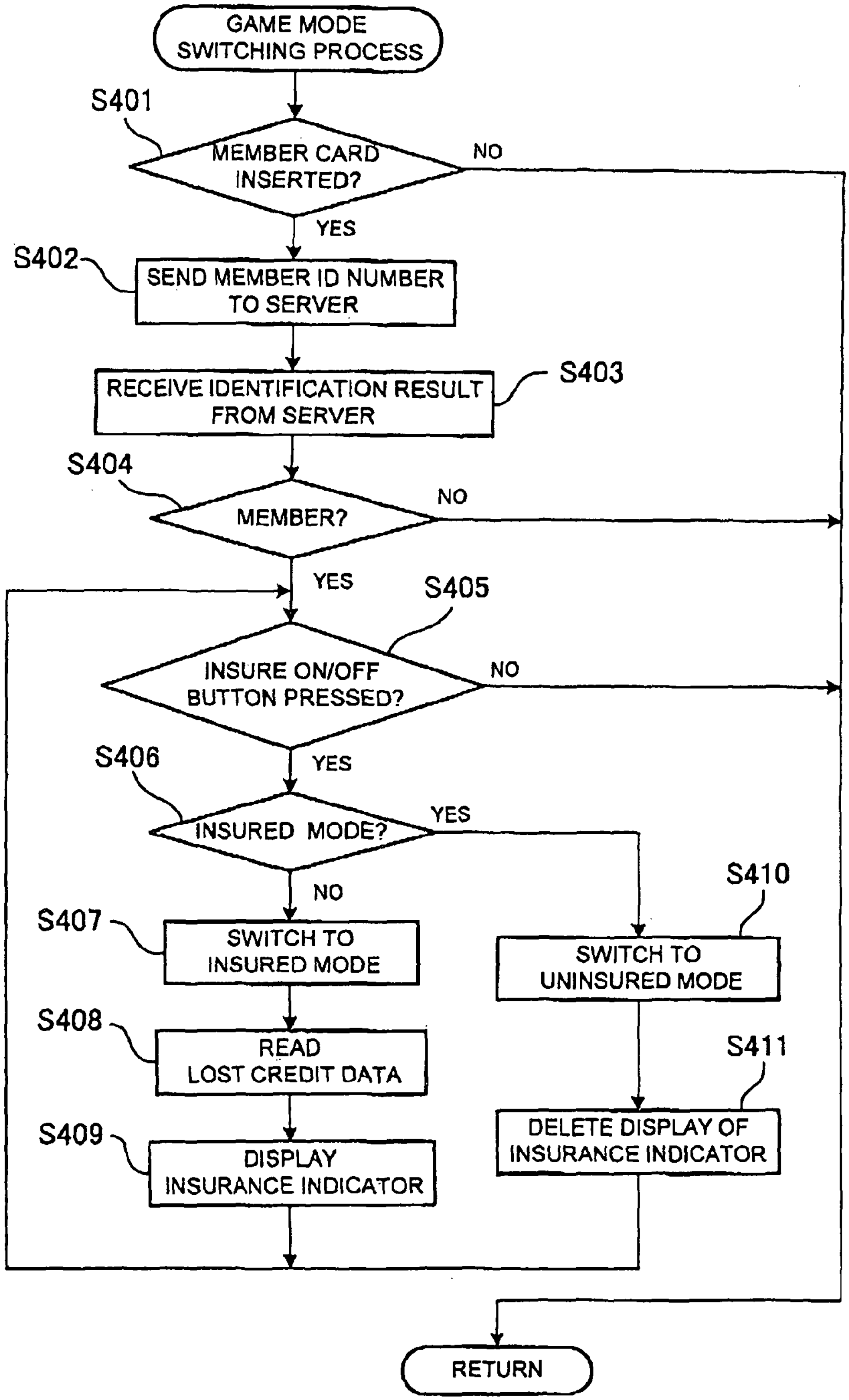
Figure 41:
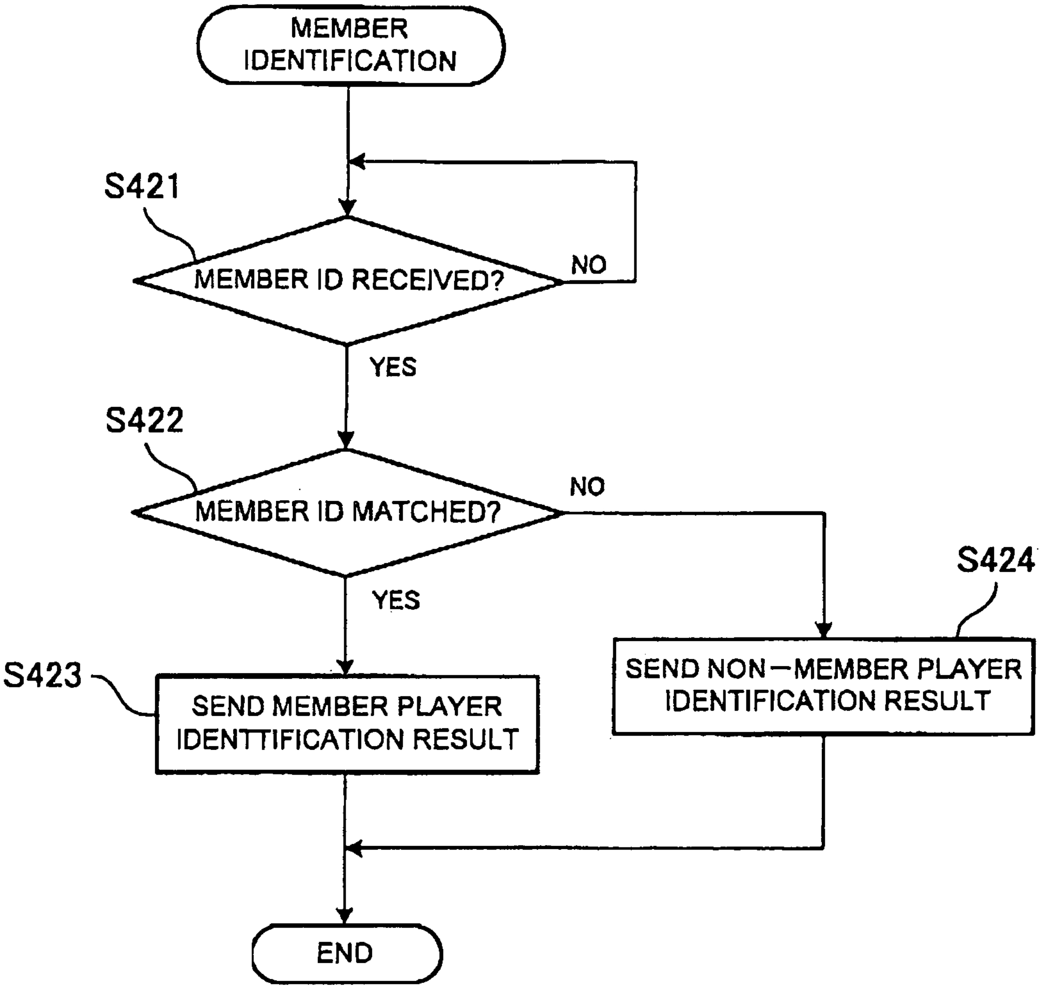

FIGS. 27A, 27B, and 27C illustrate reel bands used in the uninsured mode, the insured mode, and a high probability mode, respectively, in a third embodiment of a gaming machine according to the invention;

FIG. 28 illustrates symbol columns variably displayed on sixth and seventh reel bands shown in FIGS. 27A to 27C;

FIG. 29 is a flow chart of a loss compensation process in the third embodiment;

FIG. 30 illustrates a lottery table used in the insured mode in the third embodiment;

FIG. 31 illustrates mystery bonus game winning combinations in a special mode in a fourth embodiment of a gaming machine of the invention;

FIG. 32 is a flow chart of a main process in the fourth embodiment;

FIG. 33 is a flow chart of a loss compensation process in the fourth embodiment;

FIG. 34 illustrates a mystery bonus game lottery table used in the special mode in the fourth embodiment;

FIG. 35 is a perspective view of a slot machine according to a fifth embodiment of a gaming machine of the invention;

FIG. 36 is a block diagram of a control unit of the slot machine according to the fifth embodiment;

FIG. 37 illustrates storage areas of RAM shown in FIG. 36;

FIG. 38 is a flow chart of a game mode switching process performed in the slot machine of the fifth embodiment;

FIG. 39 is a block diagram of an embodiment of a game system according to the invention;

FIG. 40 is a flow chart of a game mode switching process performed in a slot machine included in the game system; and FIG. 41 is a flow chart of member identification performed in a server included in the game system.

DESCRIPTION OF THE PREFERRED EMBODIMENTS

Hereinafter, preferred embodiments of the invention will be described with reference to the drawings.

Figure 1:
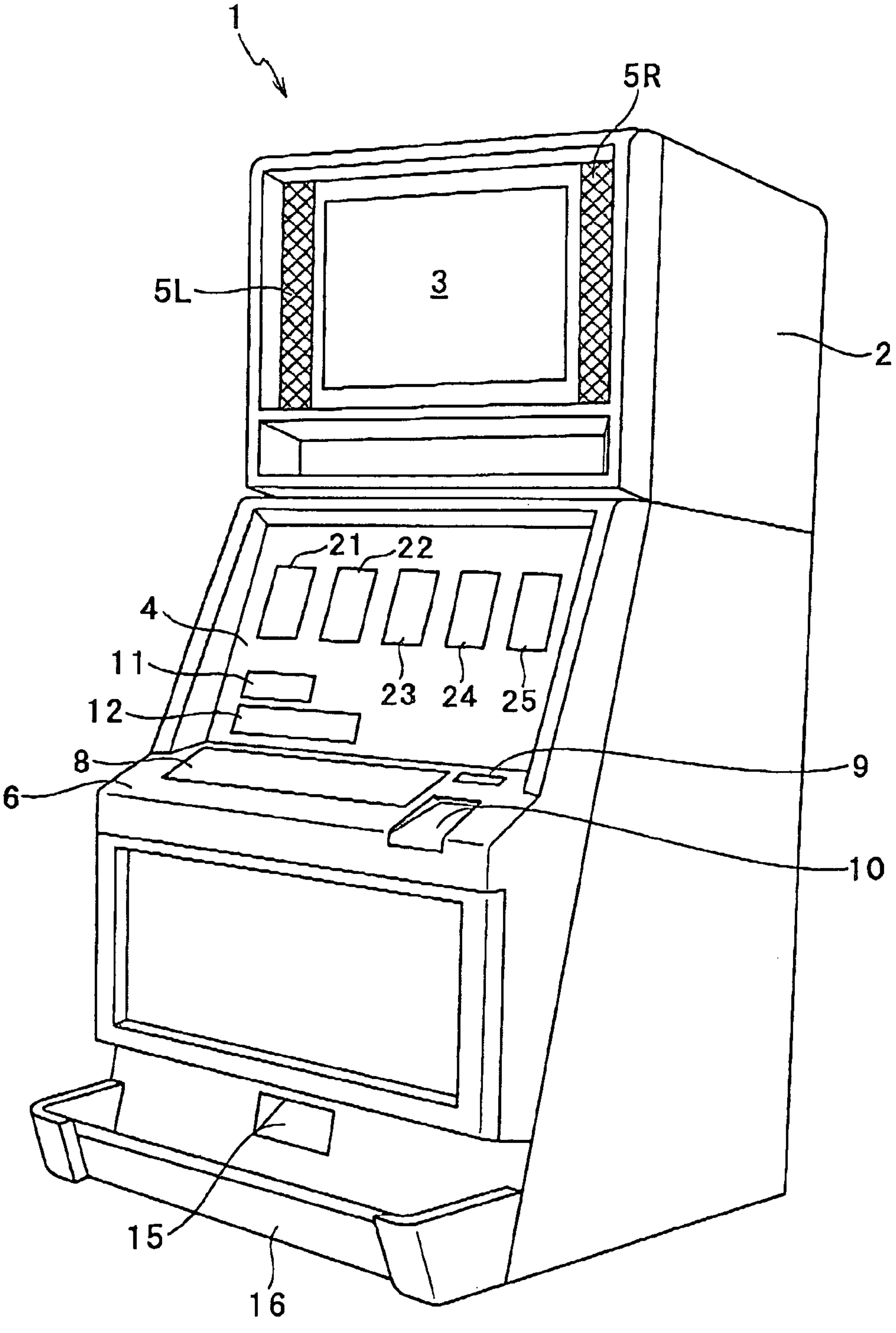
FIG. 1 is a perspective view of a slot machine according to a first embodiment of a gaming machine of the invention.

First, with reference to FIG. 1, the configuration of a slot machine 1 of a first embodiment of a gaming machine according to the invention will be described.

The slot machine 1 of the embodiment has a cabinet 2. A sub display 3 is placed on the front upper part of the cabinet 2, and a main display 4 is placed at the center of the front of the cabinet 2. The sub display 3 and the main display 4 are general-purpose liquid crystal displays.

A pair of speakers 5L and 5R is placed on the right and left of the sub display 3, which output predetermined BGM, sounds, sound effects, or the like, based on the game mode of the slot machine 1. Below the main display 4, a control panel 6 is disposed as extended toward the front. Provided on the control panel 6 are a control panel 8 arranged with various buttons, a coin insertion slot 9 and a bill insertion slot 10 into which coins and bills are respectively inserted as a game medium.

On the sub display 3, displayed are information on games such as game methods, types of winning combinations and payout numbers thereof, and various effects for games.

On the main display 4, the amount of credits currently owned and various effects image are displayed, while five video reels 21, 22, 23, 24 and 25 are displayed substantially at the center thereof. The slot machine 1 is a so-called video slot machine. On each of the video reels 21 to 25, various symbols described below are variably displayed as scrolled from above to below for a predetermined time period, and stopped in a predetermined combination. A slot game performed in the slot machine 1 is categorized into two of a base game and a bonus game, both of which are performed through the video reels 21 to 25.

On the lower left corner of the main display 4, an insurance indicator 11 and an owned credits indicator 12 are provided. The insurance indicator 11, which is displayed only when the game mode is in an insured mode described below, displays a bar graph (see FIG. 4). The bar graph represents the amount of lost credits from the time point when the insured mode is set to the present and the required amount of lost credits for compensation. Here, the amount of lost credits is derived by subtracting the amount of credits paid out based on the game result from the amount of bet credits. On the owned credits indicator 12, the amount of owned credits which are currently owned by a player is displayed. In the embodiment, one coin corresponds to one credit.

Figure 2:
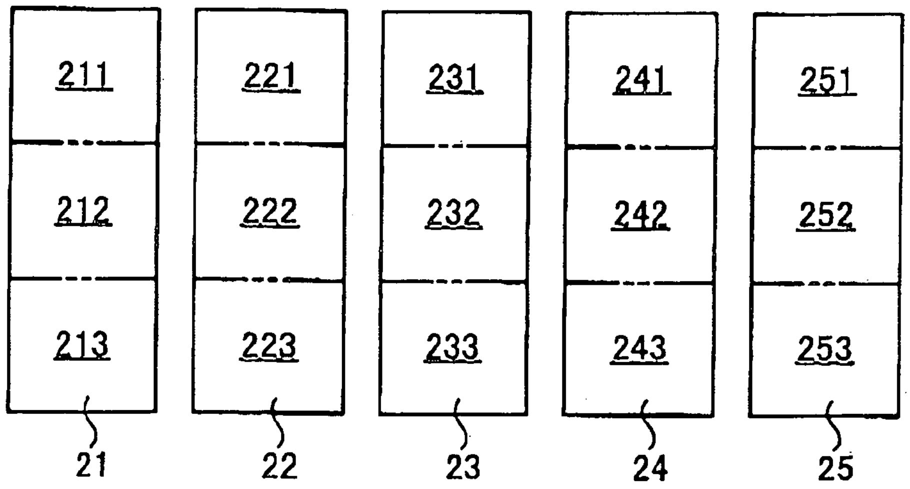
FIG. 2 illustrates video reels of the slot machine.

As shown in FIG. 2, each of the video reels 21 to 25 has three stop areas, and various symbols are stopped in each of the stop areas. More specifically, the video reel 21 has stop areas 211,212 and 213, the video reel 22 has stop areas 221, 222 and 223, the video reel 23 has stop areas 231,232 and 233, the video reel 24 has stop areas 241,242, and 243, and the video reel 25 has stop areas 251,252 and 253. In each of the stop areas 211 to 213, 221 to 223, 231 to 233, 241 to 243, and 251 to 253, a predetermined symbol is stopped and displayed based on an internal lottery described below.

In the embodiment, there are twenty pay lines each consisted of five stop areas among the stop areas 211 to 213, 221 to 223, 231 to 233, 241 to 243, and 251 to 253. The pay lines are selectively activated based on the press of a BET 1 PER LINE button 33, a BET 3 PER LINE button 34, and a BET 5 PER LINE button 35, which are described below. When symbols are stopped after variably displayed, certain symbols are arranged in a certain form on an activated pay line (hereinafter called an 'activated line') so that a payout is given.

Figure 3:
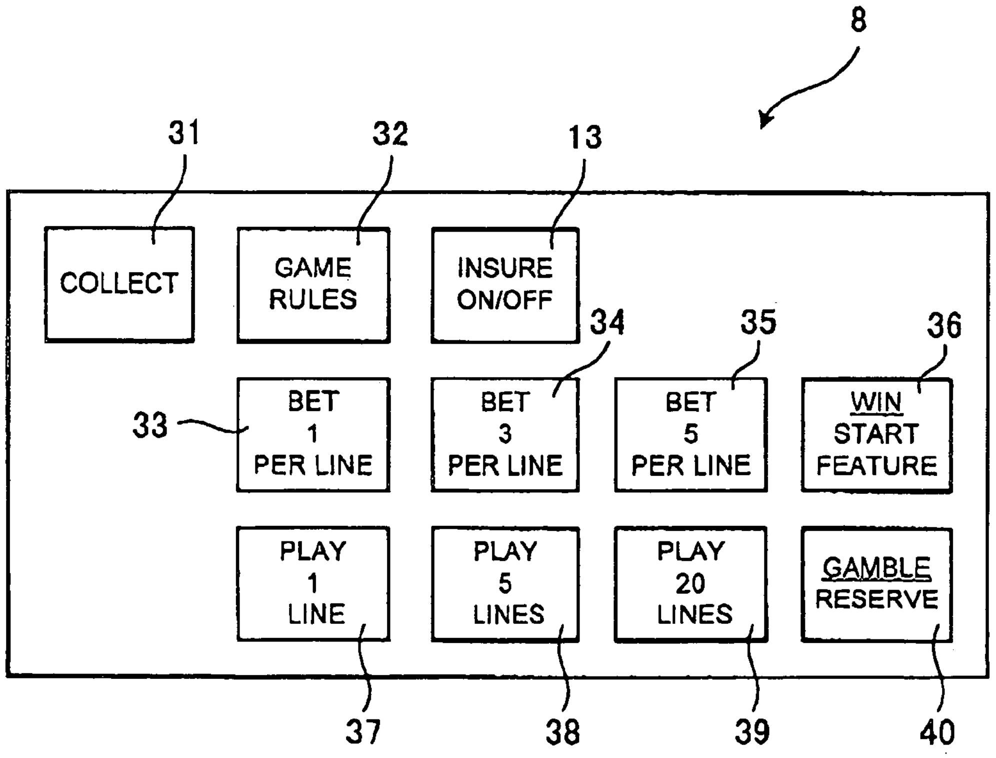
FIG. 3 illustrates a control panel of the slot machine.

On the control panel 8, various buttons are placed as shown in FIG. 3. More specifically, on the upper part of the control panel 8, a COLLECT button 31, a GAME RULES button 32, and an INSURE ON/OFF button 13 are arranged sequentially from the left, in the middle part, a BET 1 PER LINE-button 33, a BET 3 PER LINE button 34, a BET 5 PER LINE button 35, and a WIN/START FEATURE-button 36 are arranged sequentially from the left, and on the lower part, a PLAY 1 LINE button 37, a PLAY 5 LINES button 38, a PLAY 20 LINES button 39, and a GAMBLE/RESERVE button 40 are arranged sequentially from the left.

The COLLECT button 31 is a button for ending a game and for obtaining the payout of coins equivalent to the owned credits. The coins are paid out from a coin payout opening 15 to a coin tray 16 through a hopper 71 (see FIG. 6) disposed inside the slot machine 1. When the COLLECT button 31 is pressed, lost credit data used in the insured mode is initialized.

The GAME RULES button 32 is a button to be pressed when how the game should be operated is not clear to a player. When the GAME RULES button 32 is pressed, help information is displayed on the sub display 3 and/or the main display 4.

The INSURE ON/OFF button 13 is a button for switching the game, mode. The game mode in the slot machine 1 is categorized into two of the insured mode and an uninsured mode. Every time when the INSURE ON/OFF button 13 is pressed, the game mode is switched between the insured mode and the uninsured mode. In the insured mode, a compensation function works to compensate for a loss. In the embodiment, the compensation function works, when the amount of lost credits is equal to or more than an upper limit, to pay out a predetermined number of credits for compensation of collecting one credit as an insurance fee. When the game mode is in the insured mode, the insurance indicator 11 is displayed on the main display 4.

The BET 1 PER LINE button 33, the BET 3 PER LINE button 34, and the BET 5 PER LINE button 35 are buttons for increasing the bet number on each activated line by one, three, and five, respectively. The WIN START FEATURE button 36 is a button for starting a bonus game or for adding the payout obtained in the bonus game to owned credits. The PLAY 1 LINE button 37, the PLAY 5 LINES button 38, and the PLAY 20 LINES button 39 are buttons to starting a game as the number of activated lines is 1, 5, and 20, respectively.

The GAMBLE RESERVE button 40 is a button to be pressed when a player leaves a seat or pressed for playing a so-called double down game after the bonus game is ended. The double down game is a game with the credits obtained in the bonus game, the detail of which is omitted herein.

A switch is disposed inside each of the buttons 13 and 31 to 40 of the control panel 8. When a button is pressed, a switch corresponding to the button outputs a switch signal to a CPU 50 see FIG. 6). More specifically, a COLLECT switch 45 is placed in the COLLECT button 31, a GAME RULES switch 46 is placed in the GAME RULES button 32, an INSURE ON/OFF switch 76 is placed in the INSURE ON/OFF button 13, a 1-BET switch 57, a 3-BET switch 58, and a 5-BET switch 59 are placed in the BET 1 PER LINE button 33, the BET 3 PER LINE button 34, and the BET 5 PER LINE button 35, respectively, a WIN START switch 47 is placed in the WIN START FEATURE button 36, a 1-LINE switch 60 is placed in the PLAY 1 LINE button 37, a 5-LINES switch 61 is placed in the PLAY 5 LINE button 38, a 20-LINES switch 62 is placed in the PLAY 20 LINES button 39, a GAMBLE RESERVE switch 48 is placed in the GAMBLE RESERVE button 40.

A coin sensor 49 is disposed adjacent to the coin insertion slot 9 in the cabinet 2 to detect coins inserted through the coin insertion slot 9. A coin detection signal is outputted from the coin sensor 49 to the CPU 50 (see FIG. 6), and the credits equivalent to the inserted coins are added to the owned credits. Similarly, a bill sensor 67 is disposed adjacent to the bill insertion slot 10 in the cabinet 2 to detect the types and amount of bills inserted through the bill insertion slot 10. A bill detection signal is outputted from the bill sensor 67 to the CPU 50 (see FIG. 6), and the credits equivalent to the inserted bills are added to the owned credits.

On the front lower part of the cabinet 2, the coin payout opening 15 and the coin tray 16 which holds coins ejected from the coin payout opening 15 are disposed. In a passage to the coin payout opening 15 in the cabinet 2, a hopper 71, which ejects coins one by one from the coin payout opening 15, and a coin sensor 73, which detects coins paid out from the coin payout opening 15 and outputs a coin detection signal to a payout completion signal circuit 72, are disposed (see FIG. 6).

Next, with reference to FIG. 4, the insurance indicator 11 displayed on the main display 4 will be described.

Figure 4:
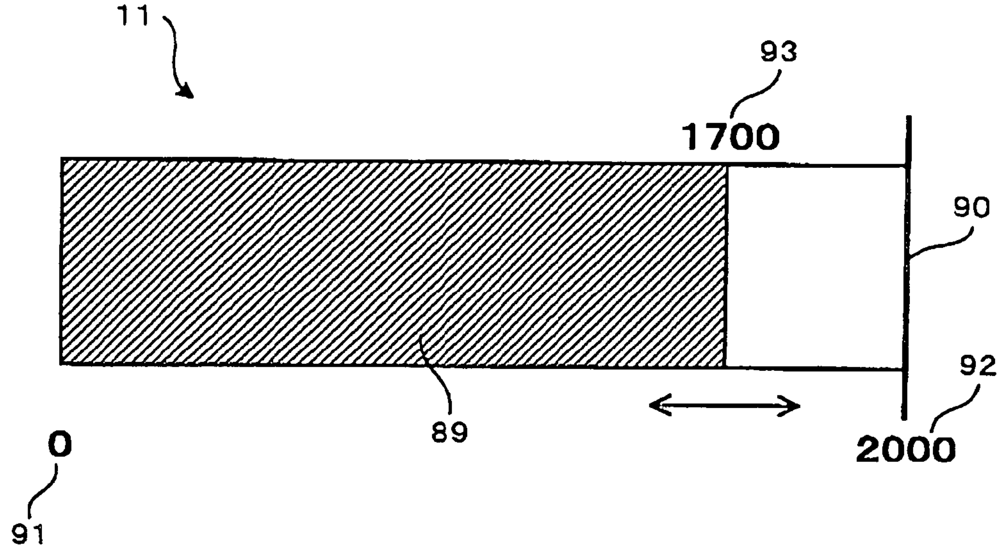
FIG. 4 illustrates an insurance indicator displayed on a main display of the slot machine.

As shown in FIG. 4, the insurance indicator 11 includes a gage part 90, an initial value display part 91, an upper limit display part 92, and a lost amount display part 93. In the gage part 90, a gage area 89 indicates the amount of lost credits by the ratio with respect to the upper limit which is 2000 credits in the embodiment. The initial value display part 91 indicates, on the right below the gage part 90, '0' as the initial value of lost credits. The upper limit display part 92 displays '2000' as the upper limit. The lost amount display part 93 indicates, at the upper right end of the gage area 89, current amount of lost credits by arabic numerals.

When a player bets, the gage area 89 extends its area rightward, and the numeric of the lost amount display part 93 is increased by the number of lost credits which is, for example, when a game is played for five activated lines and three bets per line, sixteen credits in total including one credit for the insurance fee. Then, at the end of a game, when the amount of lost credits is equal to or more than the upper limit of 2000 credits, a predetermined number of credits, e.g., 100 credits, are paid out. Here, a game is a series of performances including steps of betting, variably displaying and stopping symbols, a payout, a bonus game process, and the like.

When a player obtains a predetermined number of credits which are paid out because of a win, the gage area 89 decreases its area leftward, and the numeric of the lost amount display part 93 is reduced by the number of credits paid out. Here, when the amount of lost credits is equal to or below zero, the lost amount display part 93 always displays '0', which is the initial value of lost credits as described above, while the area of the gage area 89 is gone.

Next, with reference to FIG. 5, symbol columns variably displayed on the video reels 21 to 25 will be described.

When any one of the PLAY buttons 37 to 39 is pressed to start a game, symbol columns included in a first reel band 111, a second reel band 112, a third reel band 113, a fourth reel band 114, and a fifth reel band 115 are scrolled and displayed from above to below on the video reels 21, 22, 23, 24 and 25, respectively. After a predetermined time period has elapsed, three symbols are stopped on each of the video reels 21 to 25. Dot data for creating images of the symbols included in the reel bands 111 to 115 is stored in image ROM 82 (see FIG. 7).

The symbol columns included in the reel bands 111 to 115, have symbol arrangements, which are different from each other. Each of the symbol columns has a combination of thirteen symbols of 'LOBSTER', 'SHARK', 'FISH', 'PUNK', 'OCTOPUS', 'CRAB', 'WORM', 'A', 'K', 'Q', 'J', 'WILD', and 'SARDINE'. The symbols 'LOBSTER', 'SHARK', 'FISH', 'PUNK', 'OCTOPUS', 'CRAB', 'WORM', and 'SARDINE' depict symbols of lobster, shark, fish, a person with a guitar, octopus, crab, worm, and sardine, respectively. The symbols 'A', 'K', 'Q', 'J', and 'WILD' depict alphabets corresponding thereto.

Stopping a predetermined number of the same symbols of 'LOBSTER', 'SHARK', 'FISH', 'PUNK', 'OCTOPUS', 'CRAB', 'WORM', 'A', 'K', 'Q', and 'J', respectively, on an activated line from the left end results in a predetermined payout number (see FIG. 9). The symbol 'SARDINE' is a so-called scatter symbol so that stopping two or more of the symbol 'SARDINE' in total in any of the stop areas of the video reels 21 to 25, not limited to the activated line, results in a predetermined payout number. The symbol 'SARDINE ' is also a so-called trigger symbol so that stopping four or more of the symbol 'SARDINE' in total in any of the stop areas of the video reels 21 to 25, not limited to the activated line, results in the shift to the bonus game. The symbol 'WILD' is a so-called wild symbol to be a substitute symbol except the symbol 'SARDINE'.

Next, with reference to FIG. 6, a control unit of the slot machine 1 will be described.

Figure 6:
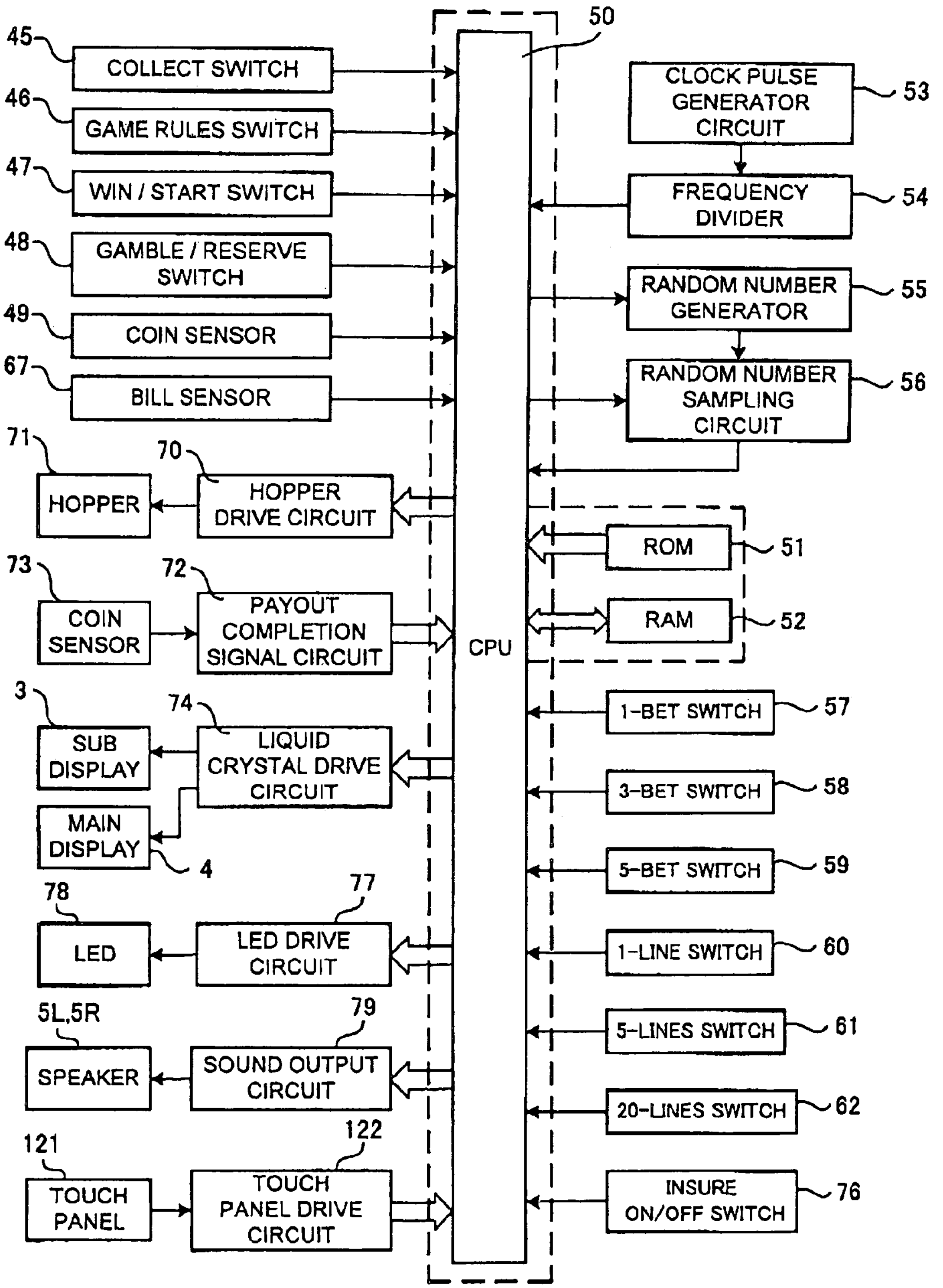
FIG. 6 is a block-diagram illustrating a control unit of the slot machine.

As shown in FIG. 6, the control unit of the slot machine 1 is configured as the CPU 50 is centered. The CPU 50 is connected to ROM 51 and RAM 52. The ROM 51 stores a main process program which is described below, a base game process program, a bonus game process program, a stop symbol determination table used for determining symbols to be stopped, a table which records winning combinations and credits paid out for the respective winning combinations (see FIG. 9), various programs necessary to control the slot machine 1, data tables, and the like. The RAM 52 is a memory for temporarily storing the amount of owned credits, the amount of lost credits from the time point when the insured mode is set to the present, the number of remaining free games in a bonus game, various data computed by the CPU 50, and the like.

A clock pulse generator circuit 53 for generating a reference clock pulse is connected to the CPU 50 via a frequency divider 54. Further connected to the CPU 50 are a random number generator 55 for generating random numbers and a random number sampling circuit 56 for sampling random numbers, which are used for various lotteries including a win lottery.

The CPU 50 controls based on the switch signals outputted from the switches embedded in the buttons 13, 31 to 40, so that various operations corresponding to each of the buttons are implemented. Moreover, the CPU 50 computes inserted coins based on the coin detection signal outputted from the coin sensor 49, and computes credits equivalent to the bill amount based on the bill detection signal outputted from the bill sensor 67.

The hopper 71, which is connected to the CPU 50 via a hopper drive circuit 70, pays out a predetermined number of coins from the coin payout opening 15, when a drive signal is outputted from the CPU 50 to the hopper drive circuit 70. The CPU 50 is also connected to a coin sensor 73 via the payout completion signal circuit 72. The payout completion signal circuit 72 outputs a payout completion signal to the CPU 50, when receiving a predetermine number of coin detection signals outputted from the coin sensor 73. Moreover, the CPU 50 is connected to the sub display 3 and the main display 4 via a liquid crystal drive circuit 74.

Figure 7:
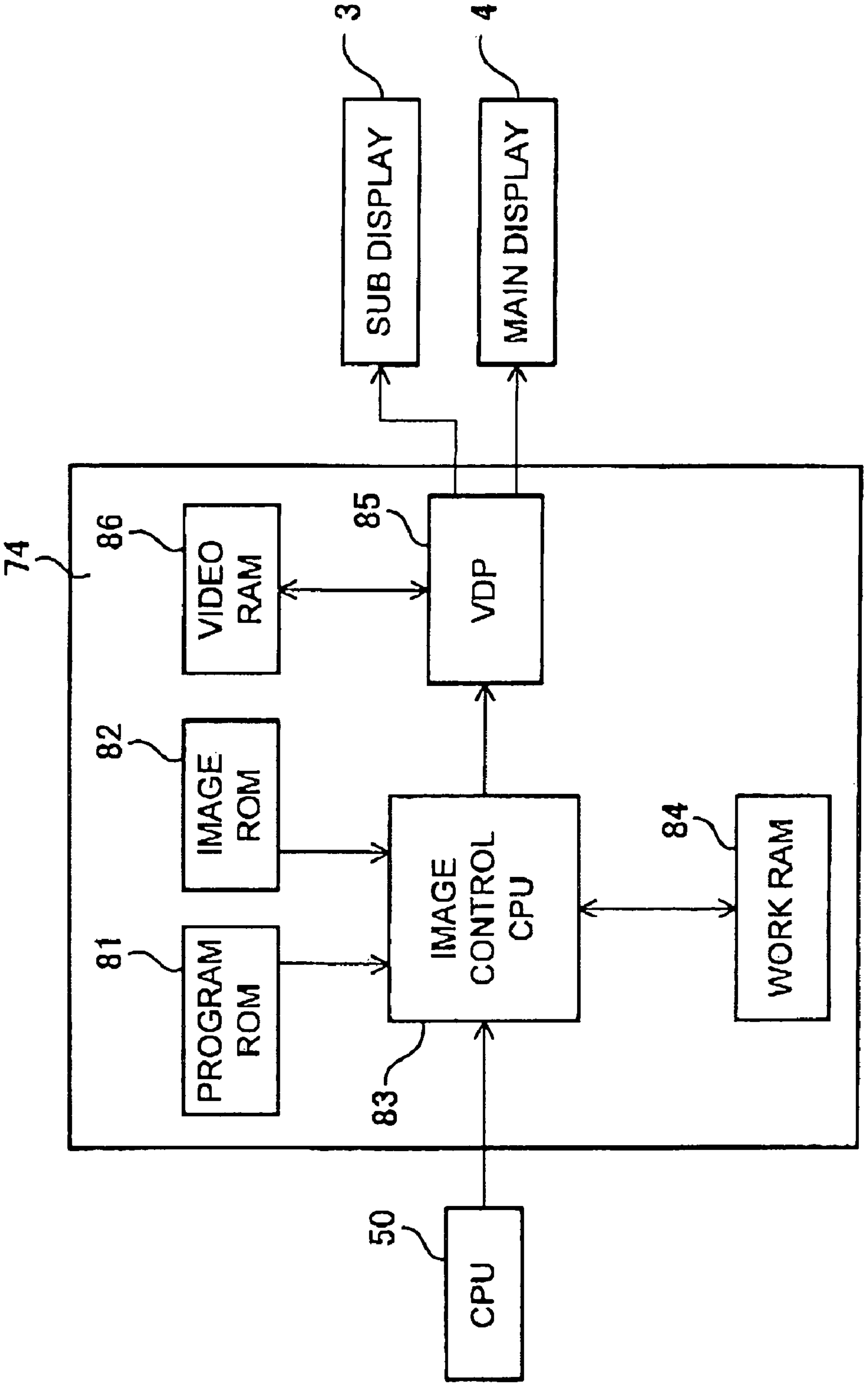
FIG. 7 is a block diagram of a liquid crystal drive circuit.

As shown in FIG. 7, the liquid crystal drive circuit 74 has program ROM 81, image ROM 82, an image control CPU 83, work RAM 84, a VDP (video display processor) 85, and video RAM 86. The program ROM 81 stores an image control program and various selection tables relating to display on the displays 3 and 4. The image ROM 82 stores dot data that creates images for the insurance indicator 11 (see FIG. 4) and symbols on the reel bands 111 to 115 (see. FIG. 5) displayed on the video reels 21 to 25. The image control CPU 83 determines images to be displayed on the displays 3 and 4 from dot data stored in the image ROM 82 in accordance with the image control program stored in the program ROM 81 based on parameters set by the CPU 50. The work RAM 84 is a temporary memory to be used when the image control CPU 83 conducts the image control program. The VDP 85 creates images in accordance with the determination by the image control CPU 83, and outputs them to the displays 3 and 4. Accordingly, the symbol columns included in the reel bands 111 to 115 are scrolled and displayed on the video reels 21 to 25. The video RAM 86 is a temporary memory to be used when images are created by the VDP 85.

An LED 78, which is connected to the CPU 50 via an LED drive circuit 77, is disposed on the front of the slot machine 1 in many numbers. Each LED 78 is controlled to be lighted by the LED drive circuit 77 based on a drive signal from the CPU 50 in making various effects. For example, the LED 78 is lighted to augment effects at a bonus game.

A sound output circuit 79 and the speakers 5L and 5R are connected to the CPU 50. The speakers 5L and 5R generate sounds and sound effects in making various effects based on a signal outputted from the sound output circuit 79.

A touch panel 121, which is connected to the CPU 50 via a touch panel drive circuit 122, is placed on a screen of the main display 4, Coordinate position data on the position where a player touches is outputted from the touch panel 121 to the CPU 50 via the touch panel drive circuit 122. The CPU 50 determines, based on that data, the position where the player touches, and the like.

Next, with reference to FIG. 8, each of the storage areas of the RAM 52 will be described.

Figure 8:
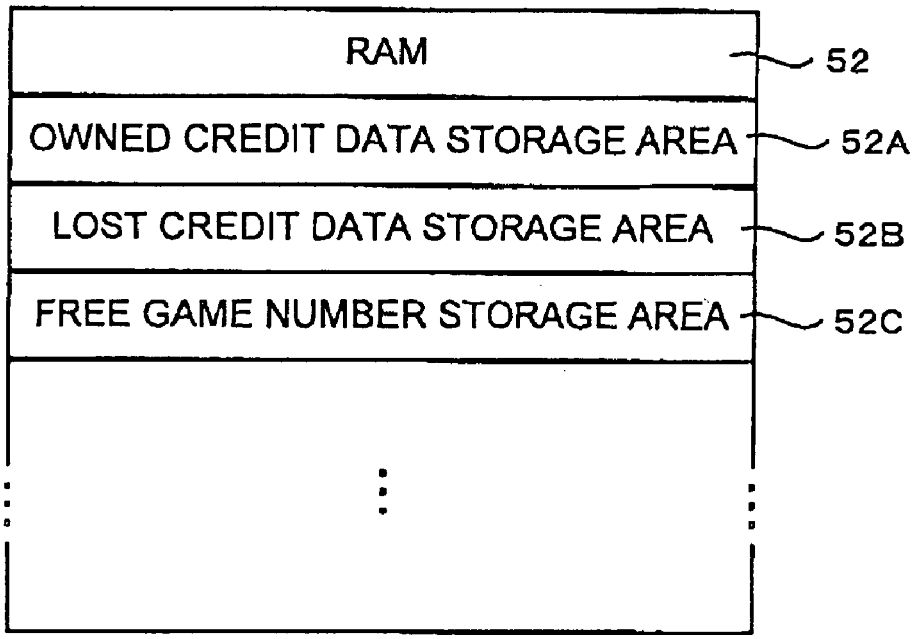
FIG. 8 is a diagram illustrating storage areas of RAM.

As shown in FIG. 8, the RAM 52 has an owned credit data storage area 52A for storing the amount of owned credits, a lost credit data storage area 52B for storing the amount of lost credits, and a free game number-storage area 52C which stores the number of remaining free games in a bonus game. The amount of lost credits stored in the lost credit data storage area 52B is displayed on the insurance indicator 11 (see FIG. 4) when the game mode is in the insured mode.

Next, the stop symbol determination table that is used for determining symbols to be stopped on the video reels 21 to 25 will be described.

The stop symbol determination table assigns code numbers '00' to '29' with respect to symbols included in each of the reel bands 111 to 115 in FIG. 5 from above, and sets a random number corresponding to each of the code numbers. In an internal lottery process in FIG. 13 which is described below, the CPU 50 samples, via the random number sampling circuit 56, five random numbers corresponding to the video reels 21 to 25, respectively, and determines symbols of the code numbers corresponding to the sampled random numbers as symbols to be stopped on the second stop areas 212, 222, 232, 242 and 252 of each of the video reels 21 to 25. For example, the sampled random number with respect to the video reel 21 is '9', the symbol 'FISH' assigned to code number '09' in the first reel band 111 is determined as a symbol to be stopped on the second stop area 212 of the video reel 21. When symbols to be stopped on a first activated line formed in the second stop areas 212, 222, 232, 242 and 252 are determined, symbols to be stopped above and below the second stop areas, i.e., on the first and third stop areas 211, 213, 221, 223, 231, 233, 241, 243, 251 and 253 are determined based on the symbol columns of the reel bands 111 to 115.

Next, with reference to FIG. 9, the winning combinations and the payout numbers thereof will be described.

The payout number shown in FIG. 9 is used to be added to the owned credits when the bet number is '1'. When the bet number is '2' or greater, the value of a corresponding payout number in FIG. 9 multiplied by the bet number is added to the owned credits.

In FIG. 9, a case where X number of certain symbols are continuously stopped on an activated line from the left end is expressed as 'XK (X=2,3,4,5)'. Thus, when two, three, four and five of the symbol 'LOBSTER' are continuously stopped on an activated line from the left end, payout numbers '10', '320', '2500', and '6000' are obtained, respectively. When two, three, four and five of the symbol 'SHARK' are continuously stopped on an activated line from the left end, payout numbers '3', '25', '150', and '1000' are obtained, respectively. Similarly, for the symbols 'FISH', 'PUNK', 'OCTOPUS', 'CRAB', 'WORM', 'A', 'K', 'Q', and 'J', payout numbers are set respectively as shown in FIG. 9.

When winning combinations of these symbols are made on two or more activated lines, the sum of the payout numbers of all the winning combinations is added to the owned credits.

The symbol 'SARDINE' is a scatter symbol. That is, stopping two, three, four, five or more of the symbol 'SARDINE' in total in any of the stop areas of the video reels 21 to 25, not limited to the activated line, results in payout numbers '2', '5', '10', and '125', respectively.

Only the payout number for the symbol 'SARDINE' shown in FIG. 9 is multiplied by the total bet number which is a product of the bet number and the activated line number, and the resulted number is added to the owned credits. A payout number for another symbol such as the symbol 'LOBSTER', which is obtained in addition to the payout number for the symbol 'SARDINE', is also added to the owned credits.

The symbol 'SARDINE' is a trigger symbol for the shift to the bonus game. That is, stopping four or more of the symbol 'SARDINE' in total in any of the stop areas of the video reels 21 to 25, not limited to the activated line, results in the shift to the bonus game as well as the payout.

Next, the bonus game will be described.

The bonus game, which is started by satisfying above-described certain conditions during the base game, is usually advantageous for a player. In the bonus game of the embodiment, so-called free games are played so that a series of 15 to 25 games are continuously played in accordance with the result of an internal lottery without betting credits.

In the bonus game, the bet number and the activated lines when shifted to the bonus game are applied. Although the winning combination and its payout number in the bonus game are the same as those in the base game, the bonus game is different from the base game in that the symbol 'SHARK' is treated as the symbol 'LOBSTER', and that the free game number is increased when four of the symbol 'SARDINE' in total are stopped on any of the stop areas of the video reels 21 to 25. As shown in FIG. 9, since the symbol 'LOBSTER' has a higher payout number than that of the symbol 'SHARK', it is highly likely for a player to suppress loss of credits and to obtain many credits in the bonus game.

Next, with reference to FIG. 10, a main process of the slot machine 1 will be described.

Programs shown in flow charts in FIGS. 10 to 17, described below, are stored in the ROM 51 and/or the RAM 52 of the slot machine 1 (see FIG. 6) and run by the CPU 50.

Figure 10:
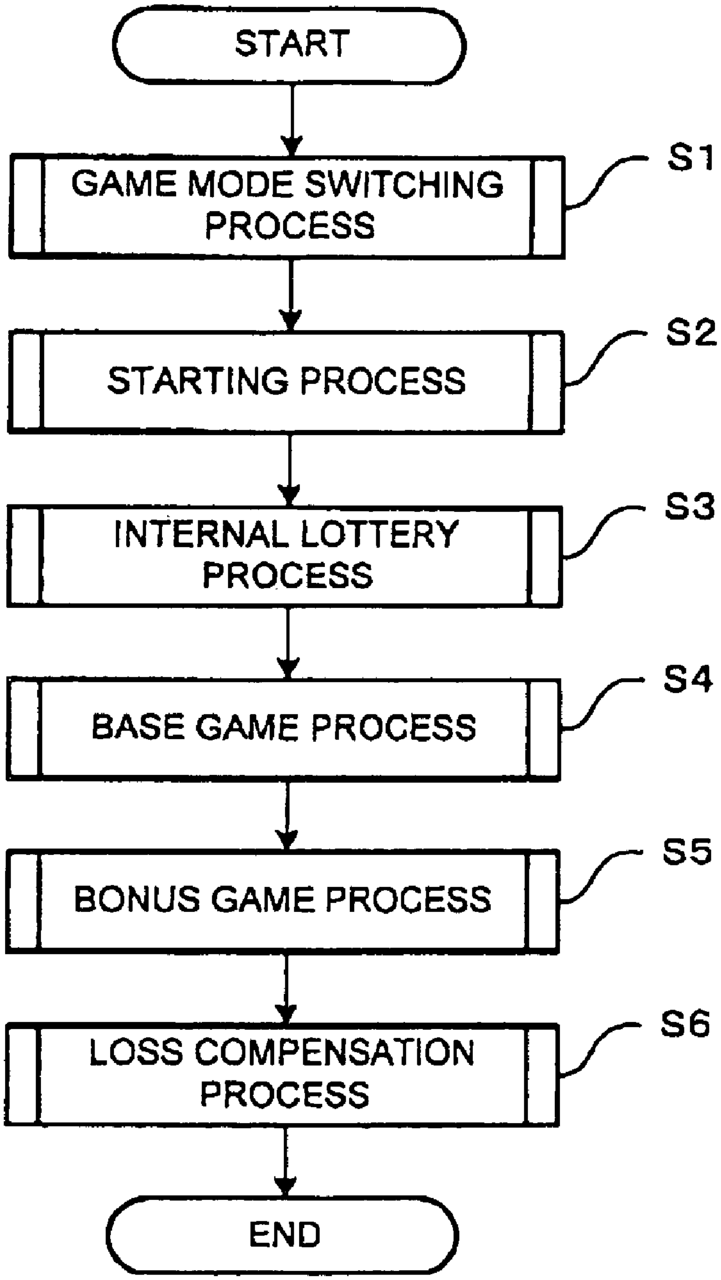
FIG. 10 is a flow chart of a main process performed in the slot machine.
Figure 11:
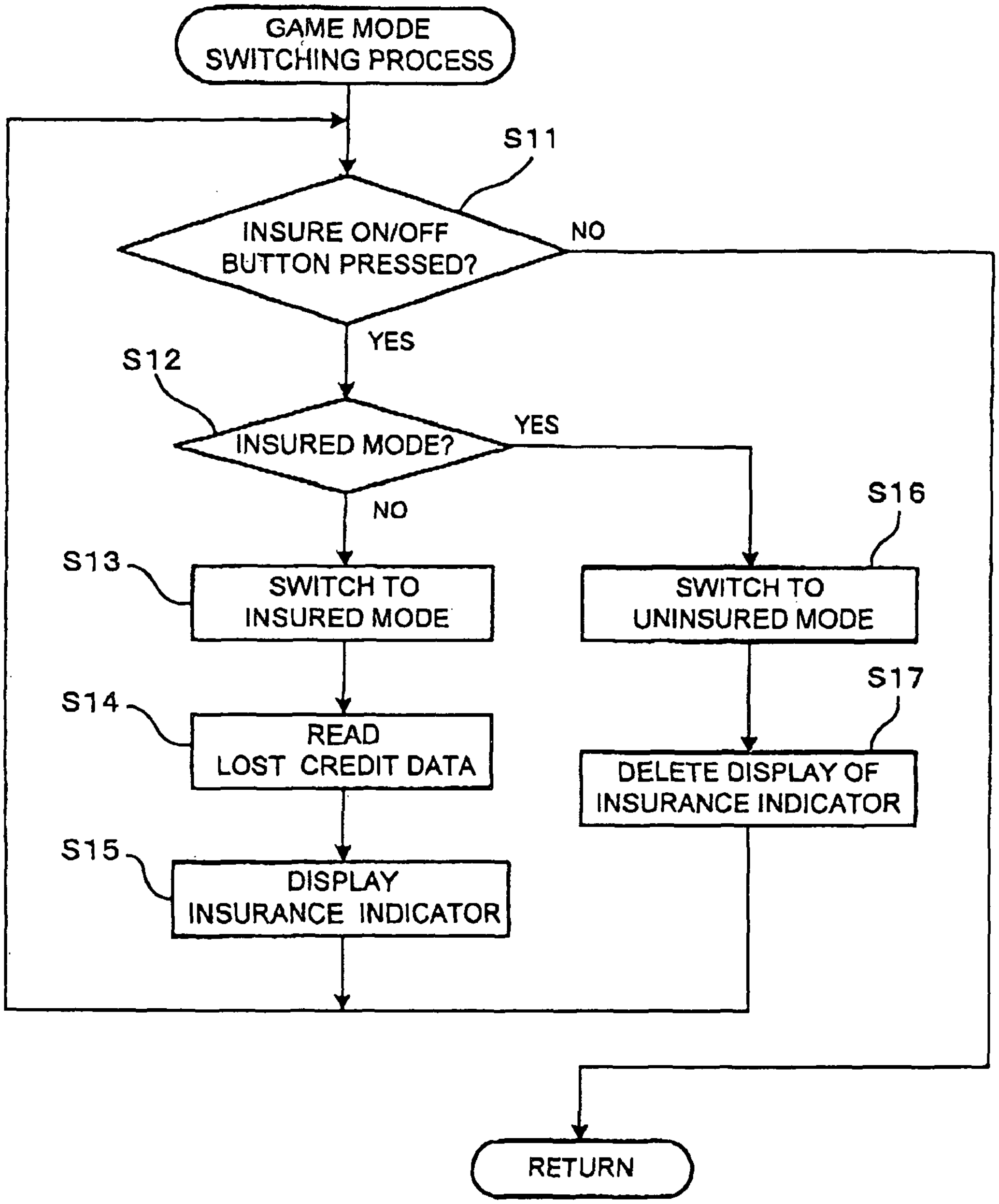
FIG. 11 is a flow chart of a game mode switching process at S1 in FIG. 10.

First, as shown in FIG. 10, at Step (hereinafter, it is abbreviated to S) 1, a game mode switching process, which is described below with reference to FIG. 11, is performed to switch the current game mode based on the press of the INSURE ON/OFF button 13.

Figure 12:
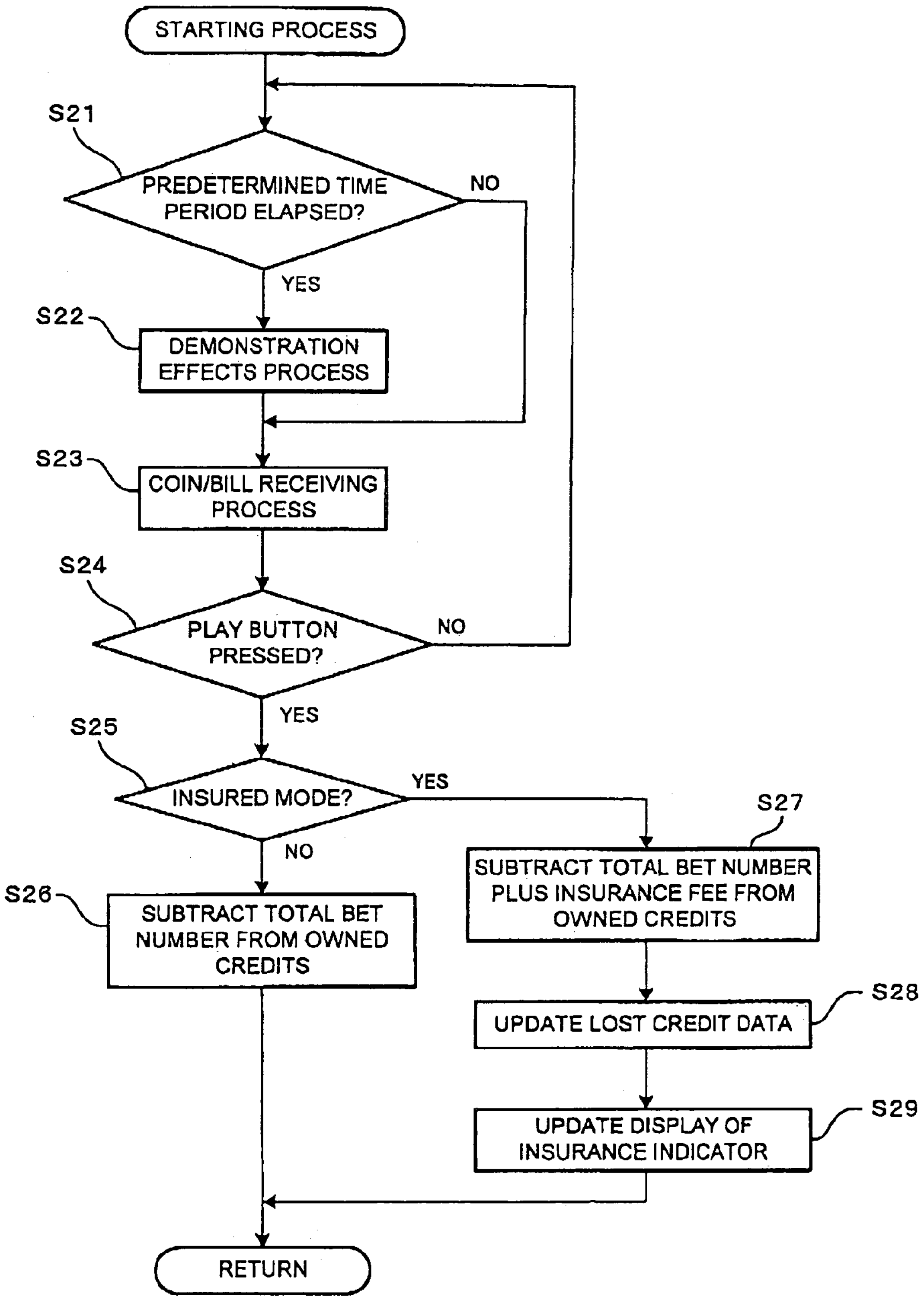
FIG. 12 is a flow chart of a starting process at S2 in FIG. 10.
Figure 13:
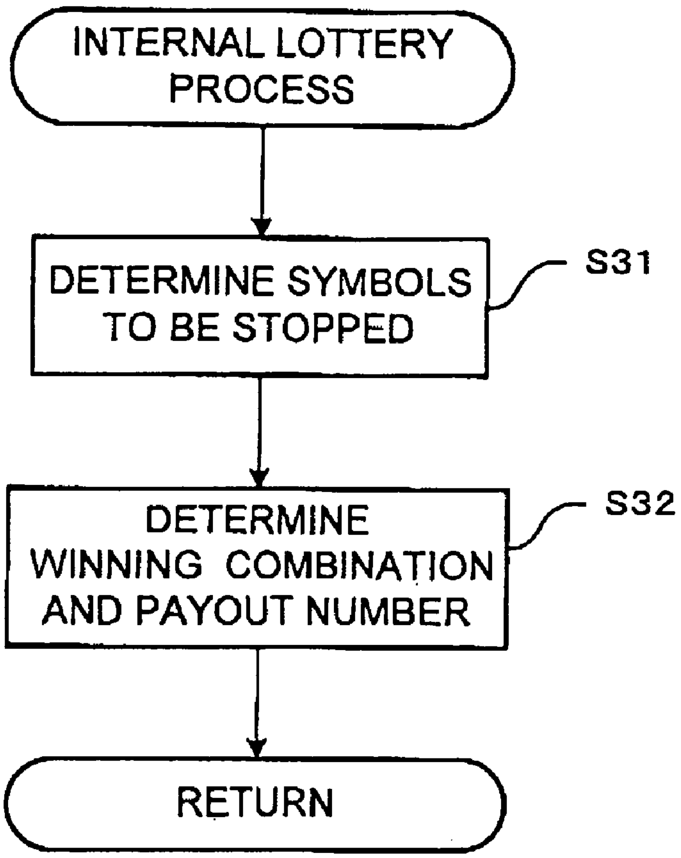
FIG. 13 is a flow chart of an internal lottery process at S3 in FIG. 10.
Figure 14:
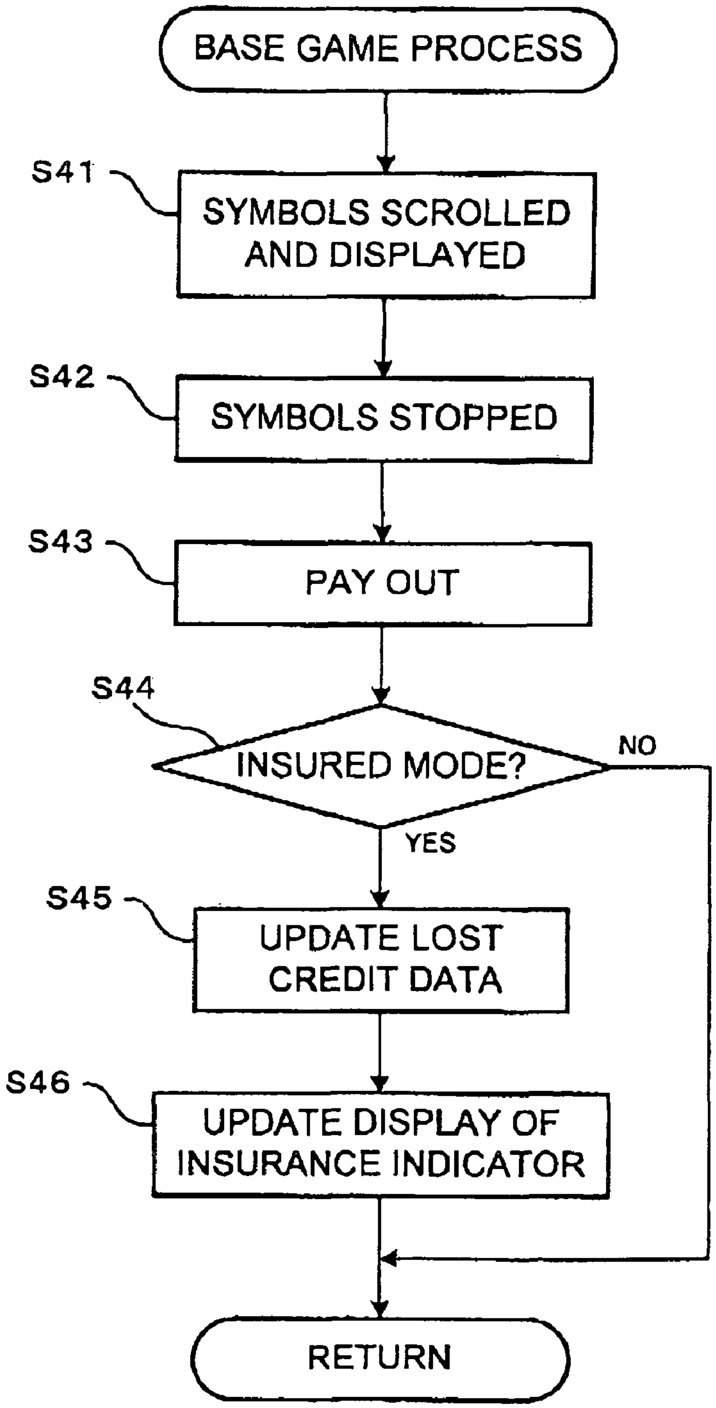
FIG. 14 is a flow chart of a base game process at S4 in FIG. 10.
Figure 15:
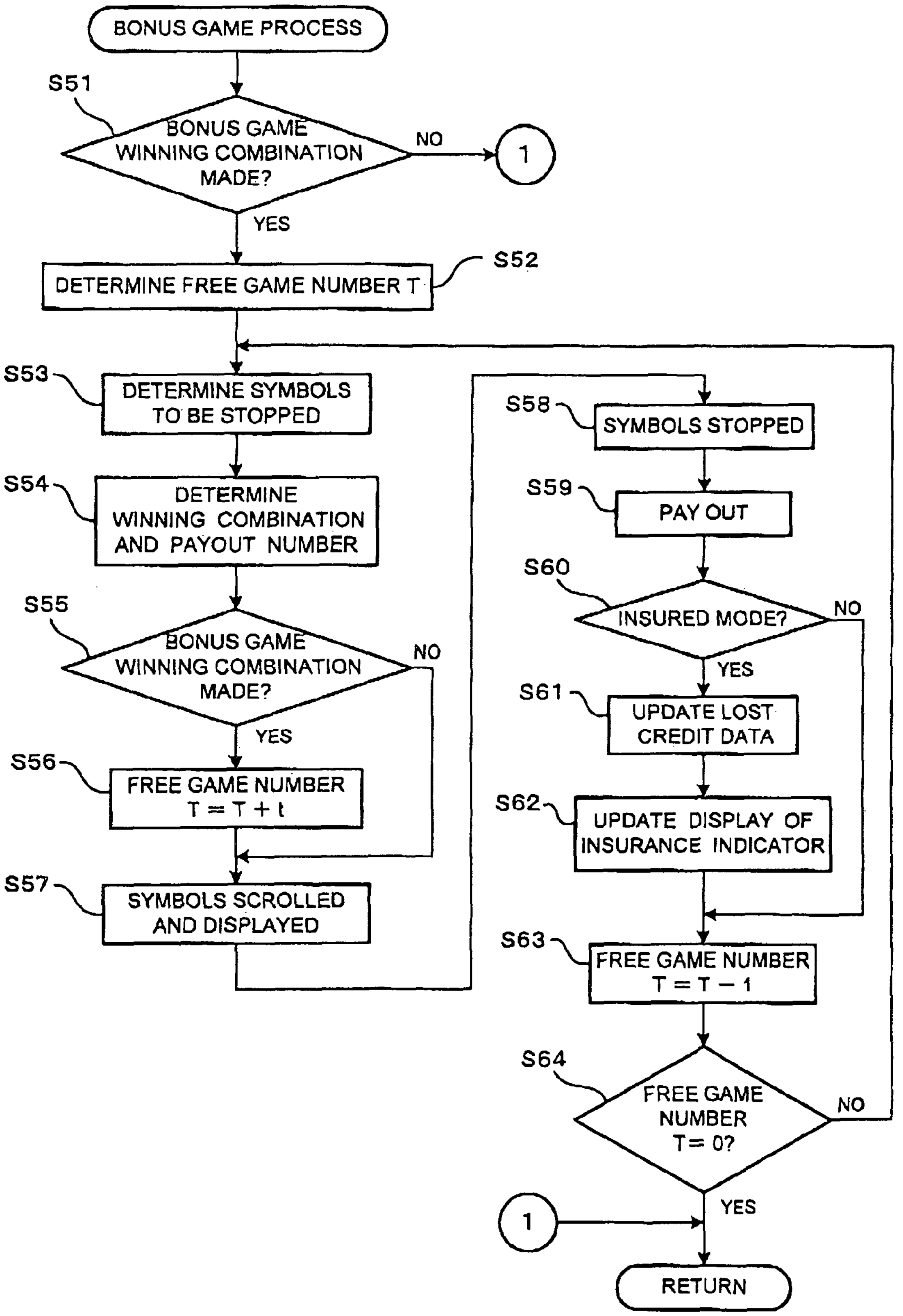
FIG. 15 is a flow chart of a bonus game process at S5 in FIG. 10.
Figure 16:
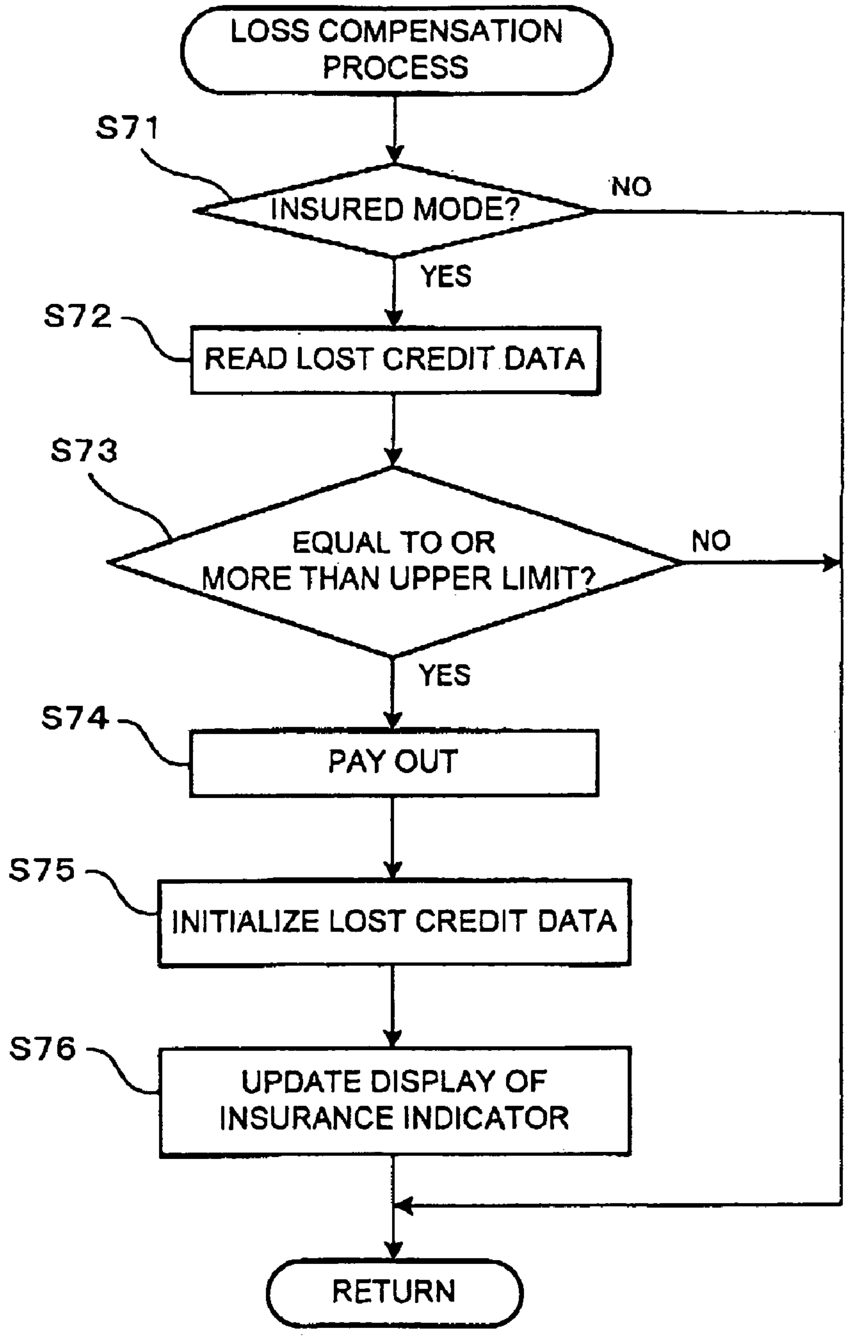
FIG. 16 is a flow chart of a loss compensation process at S6 in FIG. 10.

After the game mode switching process is performed at S1, a starting process, which is described below with reference to FIG. 12, is performed at S2. Then, based on the switch signals outputted from the LINE switches 60 to 62, an internal lottery process, which is described below with reference to FIG. 13, is performed at S3. A base game process, which is described below with reference to FIG. 14, is performed at S4, and after that, a bonus game process, which is described below with reference to FIG. 15, is performed at S5. Subsequently, a loss compensation process in FIG. 16 is performed at S6, and then the main process program is ended.

Next, with reference to FIG. 11, the game mode switching process at S1 in FIG. 10 will be described.

First, as shown in FIG. 11, at S11, the CPU 50 determines whether the INSURE ON/OFF button 13 is pressed, based on the switch signal from the INSURE ON/OFF switch 76. When it is determined that the INSURE ON/OFF button 13 is not pressed (S11: NO), the game mode switching process is ended to return to the main process shown in FIG. 10, and the process is moved to the starting process (S2). When it is determined that the INSURE ON/OFF button 13 is pressed (S11: YES) it is determined whether the game mode is in the insured mode (S12).

When it is determined that the gaze mode is in the uninsured mode (S12: NO), the game mode is switched to the insured mode (S13) to apply the compensation function. In the insured mode where the compensation function works, for compensation of collecting one credit as an insurance fee (S27), as shown in FIG. 16, when the amount of lost credits is equal to or more than the upper limit, credits are paid for compensation for a loss (S74).

At S14, the amount of lost credits, which is stored in the lost credit data storage area 52B in the RAM 52, is read. At S15, based on the amount of lost credits read at S14, the insurance indicator 11 (see FIG. 4) is displayed on the main display 4. Then, the process is returned to S11.

When it is determined that the game mode is in the insured mode (S12: YES), the game mode is switched to the uninsured mode (S16) where a game is processed without applying the loss compensation function as described above.

At S17, the insurance indicator 11 deleted from the main display 4. Then, the process is returned to S11.

Next, with reference to FIG. 12, the starting process at S2 in FIG. 10 will be described.

First, as shown in FIG. 12, at S21, the CPU 50 determines whether a predetermined time period (for example, 15 seconds) has elapsed. When it is determined that a predetermined time period has not elapsed (S21: NO), the process is moved to S23. When it is determined that a predetermined time period has elapsed (S21: YES), an image for demonstration effects is displayed on the sub display 3 and/or the main display 4 at S22, and then the process is moved to S23.

At S23, a coin/bill receiving process is performed so as to increase the owned credits based on coins inserted through the coin insertion slot 9 and the bills inserted through bill insertion slot 10. More specifically, when a coin is detected by the coin sensor 49, the amount of owned credits stored in the owned credit data storage area 52A in the RAM 52 is increased by one. Furthermore, when a bill is detected by the bill sensor 67, the amount of owned credits stored in the owned credit data storage area 52A in the RAM 52 is increased by the credits equivalent to the amount of the bill detected. Assuming that ten cents corresponds to one coin, a one-dollar bill is equivalent to ten credits. Then, in association with change of the amount of owned credits, the numeric shown on the owned credits display part 12 is updated.

At S24, the CPU 50 determines whether any one of the PLAY buttons 37 to 39 is pressed. When it determines that any one of the PLAY buttons 37 to 39 is not pressed (S24: NO) the process is returned to S21 to repeat the process described above. When it determines that any one of the PLAY buttons 37 to 39 is pressed (S24: YES), the process is moved to S25 even during demonstration effects.

At S25, it is determined whether the game mode is in the insured mode. When it is determined that the game mode is in the uninsured mode (S25: NO), the total bet number is subtracted from the owned credits (S26). More specifically, the amount of owned credits stored in the owned credit data storage area 52A in the RAM 52 is read, the total bet number is subtracted from the owned credits, and the resulted owned credit data is written to the RAM 52. Then, in association with change of the amount of owned credits, the numeric shown on the owned credits display part 12 is updated. After that, the starting process is ended.

When it is determined that the game mode is in the insured mode (S25: YES), the value that the total bet number is added with one credit as an insurance fee is subtracted from the owned credit (S27). For example, when five pay lines are activated and the bet number per line is five bets by the BET 5 PER LINE button 35 and the PLAY 5, LINES button 38, the total bet number is twenty-five and the subtracted value is twenty-six. Here, the amount of owned credits stored in the owned credit data storage area 52A in the RAM 52 is read, the total bet number and one credit as an insurance fee are subtracted from the owned credits, and the resulted owned credit data is written to the RAM 52. Then, in association with change of the amount of owned credits, the numeric shown on the owned credits display part 12 is updated.

After that, at S28, the amount of lost credits stored in the lost credit data storage area 52B in the RAM 52 is read, the total bet number and one credit as an insurance fee are added to the lost credits, and the lost credit data is updated.

At S29, based on the lost credit data updated at S28, display of the insurance indicator 11 (see FIG. 4) is updated. More specifically, the gage area 89 is extended rightward by the area corresponding to the added credits, and the numeric shown in the lost amount display part 93 is increased by the credits spent this time. After that, the starting process is ended.

Next, with reference to FIG. 13, the internal lottery process at S3 in FIG. 10 will be described.

First, as shown in FIG. 13, at S31, symbols to be stopped on the video reels 21 to 25 are determined. More specifically, as described above, five random numbers each corresponding to the video reels 21 to 25 are sampled by the random number sampling circuit 56, the stop symbol determination table is referenced to determine symbols of the code numbers (see FIG. 5) corresponding to the sampled random numbers for each of the video reels 21 to 25. When the symbols to be stopped on the second stop areas 212, 222, 232, 242 and 252 of the video reels 21 to 25 are determined in this manner, symbols to be stopped above and below the second stop areas, i.e., on the first and third stop areas 211, 213, 221, 223, 231, 233, 241, 243, 251 and 253 are determined based on the symbol columns of the reel bands 111 to 115 in FIG. 5.

After the symbols to be stopped on the video reels 21 to 25 at S31 are determined, the winning combination on the activated line and the payout number thereof are determined at S32 based on the table in FIG. 9. Then, the process is returned to the main process to move to the base game process at S4 in FIG. 10.

Next, with reference to FIG. 14, the base game process at S4 in FIG. 10 will be described.

First, as shown in FIG. 14, at S41, based on the switch signal from the switch 60 to 62 corresponding to any one of the PLAY buttons 37 to 39 that is determined as pressed at S24 in the starting process (S2), symbols are started to be scrolled and displayed on the video reels 21 to 25.

After that, scrolling is stopped, and the symbols determined at S31 in FIG. 13 are stopped on the video reels 21 to 25 (S42). At S43, paid out are credits that correspond to the payout number determined at S32 in FIG. 13 in accordance with the symbols stopped on the activated line. Here, the amount of owned credits stored in the owned credit data storage area 52A in the RAM 52 is read, the paid out credits are added, to the owned credits, and the resulted owned credit data is written. Then, in association with change or the amount of owned credits, the numeric shown on the owned credits display part 12 is updated.

At S44, it is determined whether the game mode is in the insured mode. When it is determined that the game mode is in the uninsured mode (S44: NO), the base game process is ended with the mode kept. When it is determined that the game mode is in the insured mode (S44: YES), the amount of lost credits stored in the lost credit data storage area 52B in the RAM 52 is read to subtract the credits paid out at S43, and the lost credit data is updated (S45).

At S46, based on the lost credit data updated at S45, display of the insurance indicator 11 (see FIG. 4) is updated. More specifically, the gage area 89, is reduced leftward by the area corresponding to the subtracted credits, and the numeric shown in the lost amount display part 93 is decreased by the credits obtained at this time. After that, the base game process is ended.

Next, with reference to FIG. 15, the bonus game process at S5 in FIG. 10 will be described.

First, as shown in FIG. 15, at S51, it is determined whether a player wins a bonus game. More specifically, when it is determined that four or more of the symbol ‘SARDINE’, which is a trigger symbol for the shift to the bonus game, are stopped on any of the stop areas of the video reels 21 to 25 in the internal lottery process (S3) in FIG. 10, it is determined that a player wins a bonus game (S51: YES), and the process is moved to S52. When it is determined that a player does not win a bonus game (S51: NO), the bonus game process is ended to return to the loss compensation process (S6) in the main process in FIG. 10.

At S52, the free game number T is determined by lottery among any one of 10 to 25 games based on the random number sampled by the random number sampling circuit 56. The free game number T thus determined is stored in the free game number storage area 52C in the RAM 52.

At S53, the symbols to be stopped on the video reels 21 to 25 are determined. The symbols to be stopped are determined for each of the video reels 21 to 25, as similar to S31 in FIG. 13.

After the symbols to be stopped on the video reels 21 to 25 are determined at S53, based on the table in FIG. 9, the winning combination on the activated line and the payout number are determined (S54). It should be noted that in the bonus game, the symbol ‘SHARK’ is treated as the symbol ‘LOBSTER’ as described above.

At S55, it is determined whether the player wins the bonus game in symbol determination by the internal lottery at S53. Here, as similar to S51, when it is determined that four or more of the symbol ‘SARDINE’, which is a trigger symbol for the shift to the bonus game, are stopped on any of the stop areas of the video reels 21 to 25, it is determined that the player wins the bonus game (S55: YES), and then the process is moved to S56. When it is determined that the player does not win the bonus game (S55: NO), S56 is skipped to move to S57.

At S56, the game number 't' for the free game is newly determined by lottery, and the game number 't' is added to the free game number T (S56). Therefore, when a player wins a bonus game during the bonus game, the number of the remaining free games in the current bonus game is increased. For example, in a bonus game having the free game number 20, when a player wins a 17 games at the twelfth free game, the player can play free games for 25 games (20 games−12 games+17 games) after that.

At S57, as similar to S41 in the base game process, the symbols are scrolled and displayed on the video reels 21 to 25. After that, at S58, as similar to S42 in the base game process, scrolling is stopped, and the symbols determined at S53 are stopped on the video reels 21 to 25. At S59, credits corresponding to the payout number, which is determined at S54 in accordance with the symbols stopped on the on the activated line, are paid out.

At S60, it is determined whether the game mode is in the insured mode. When it is determined that the game mode is in the uninsured mode (S60: NO), the process is moved to S63. When it is determined that the game mode is in the insured mode (S60: YES), the amount of lost credits stored in the lost credit data storage area 52B in the RAM 52 is read to subtract the credits paid out at S59, and the lost credit data is updated (S61)

At S62, based on the lost credit data updated at S61, display of the insurance indicator 11 is updated. More specifically, the gage area 89 is reduced leftward by the area corresponding to the subtracted credits, and the numeric shown in the lost amount display part 93 is decreased by the credits obtained at this time. After that, the process is moved to S63.

At S63, the CPU 50 reads the free game number T stored in the free game number storage area 52C in the RAM 52, subtracts '1' from the read number T, and stores the subtracted number in the RAM 52.

Then, the CPU 50 determines whether the free game number T stored in the RAM 52 is zero (S64). In other words, it is determined whether the free game will be performed. When the free game number T is not zero (S64: NO), the process is returned to S53 to repeat the process, described above. When the free game number T is zero (S64: YES), the bonus game process is ended.

Next, with reference to FIG. 16, the loss compensation process at S6 in FIG. 10 will be described.

First, at S71 in FIG. 16, it is determined whether the game mode is in the insured mode. When it is determined that the game mode is in the uninsured mode (S71: NO), the loss compensation process is ended.

When it is determined that the game mode is in the insured mode (S71: YES), the amount of lost credits stored in the lost credit data storage area 52B in the RAM 52 (S72) is read. Then, it is determined whether the amount of lost credits read at S72 is equal to or more than the upper limit (S73). When it is determined that the amount of lost credits is less than the upper limit (S73: NO), the loss compensation process is ended. When it is determined that the amount of lost credits is equal to or more than the upper limit (S73: YES), 100 credits are paid out (S74).

After that, the amount of lost credits stored in the lost credit data storage area 52B in the RAM 52 is initialized to '0' (S75). At S76, based on the amount of lost credits initialized at S75, display of the insurance indicator 11 is updated. More specifically, the numeric of the lost amount display part 93 is turned to '0' to remove the area of the gage area 89 (see FIG. 4). After that, the loss compensation process is ended.

Then, with reference to FIG. 17, an interruption process program performed in the slot machine 1 will be described.

The interruption process program is performed at every fixed time period during the main process in FIG. 10, at every 4 ms, for example, to initialize each of the amounts of credits stored in the RAM 52 in accordance with the press of the COLLECT button 31.

Figure 17:
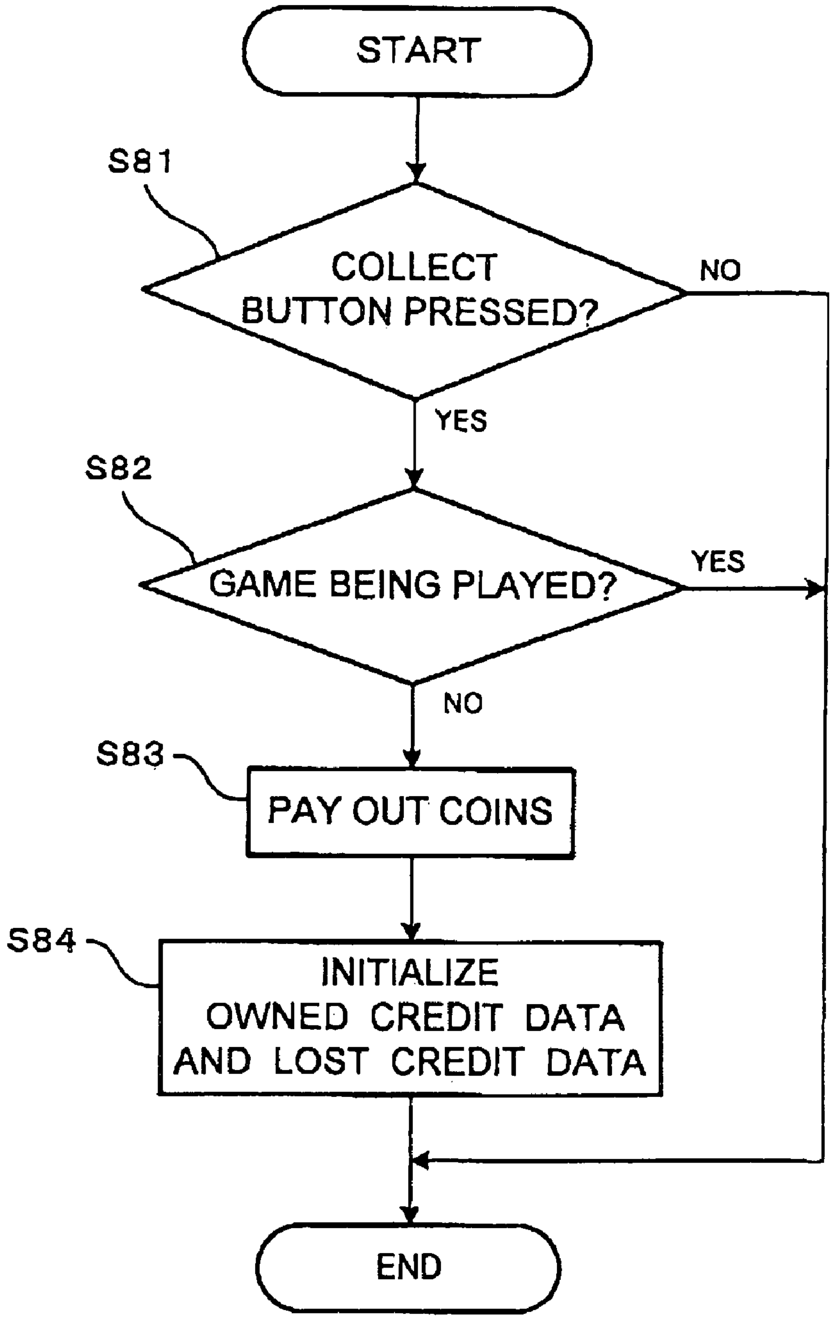
FIG. 17 is a flow chart of an interruption process performed in the slot machine.

First, as shown in FIG. 17, the CPU 50 determines whether the COLLECT button 31 is pressed at S81. When it is determined that the COLLECT button 31 is not pressed (S81: NO), the interruption process is ended. When it is determined that the COLLECT button 31 is pressed (S81: YES), it is determined whether a player is playing a game (S82). Here, assuming that a game is being played from the time point when the CPU 50 receives the switch signal outputted from any-one of the switches 57 to 62 based on the press of the BET buttons 33 to 35 and the PLAY buttons 37 to 39 to the end of the loss compensation process (S6).

When it is determined that the game is being played (S82: YES), the interruption process is ended even when the switch signal is received from the COLLECT switch 45. When it is determined that the game is not being played (S82: NO), the coins corresponding to the amount of owned credits stored in the owned credit data storage area 52A in the RAM 52 are paid out (S83).

After that, the data stored in the owned credit data storage area 52A and in the lost credit data-storage area 52B in the RAM 52 are both initialized to '0' (S84). Then, the interruption process is ended.

As described above, according to the slot machine 1 of the first embodiment, based on the press of the INSURE ON/OFF button 13, the game mode is switched between the insured mode where the compensation function works and the uninsured mode where the compensation function does not work. In other words, a-player can select whether or not to apply the compensation function by his/her intention. Thus, player's satisfaction can be increased.

The insurance indicator 11 is disposed on the main display 4, which displays a bar graph (see FIG. 4) representing the amount of lost credits from the time point when the insured mode is set to the present and the required amount of lost credits for compensation. Since the insurance indicator 11 is displayed only when the game mode is in the insured mode, a player seeing the insurance indicator 11 displayed on the main display 4 can know that the game mode is in the insured mode. Furthermore, a player can confirm the amount of lost credits as seeing the insurance indicator 11, and can select whether or not to apply the compensation function properly in accordance with the current game condition.

Since the insurance indicator 11 (see FIG. 4) displays the amount of lost credits ('1700' in FIG. 4) as well as the upper limit thereof ('2000' in FIG. 4), a player can know a guideline until credits for compensation are paid out, and can select whether or not to apply the compensation function further properly.

Since the insurance indicator 11 (see FIG. 4) displays the amount of lost credits and the upper limit by graph, the player can know a guideline until credits for compensation are paid out intuitively, quickly.

When the game mode is in the uninsured mode, the insurance indicator 11 (see FIG. 4) is not displayed (see S16 and S17 FIG. 11). Therefore, the player can know that the game mode is in the uninsured mode when the insurance indicator 11 is not displayed on the main display 4. Moreover, since the insurance indicator 11 is not displayed in the uninsured mode, the player can play games in more concentration.

In accordance with pressing the COLLECT button 31, it is determined that the game is ended and the change of player is detected, so that the lost credit data stored in the RAM 52 is initialized (S84 in FIG. 17). Therefore, the following can be avoided: a player plays games on a gaming machine for a while with no win and moves to another gaming machine, and another player who sits down right after the previous player has gone takes over the previous player's lost credits and receives a payout of credits by lost credits smaller than usual; a player playing on a gaming machine continuously wins to receive a payout of many credits and then moves to another gaming machine, and another player who sits down right after the previous player has gone cannot obtain credits for compensation even though he/she loses the upper limit. In the embodiment, even though a player plays games at the same slot machine 1 for a long time in a game shop where many slot machines 1 are placed, for example, or even though a player changes the slot machine 1 for playing games, the player can receive a proper compensation based on his/her game result. Therefore, the player can be assured to play games.

Next, with reference to FIG, 18, an exemplary modification of the starting process shown in FIG. 12 will be described.

In the exemplary modification, instead of further subtracting one credit as in the example shown in FIG. 12, coins and bills are exchanged into credits in a rate lower than the usual rate in the coin/bill receiving process (see FIG. 19) to collect an insurance fee. More specifically, inserted coins and bills are exchanged into credits in a rate of 97% to be the owned credits, and the remaining 3% is collected as an insurance fee. Here, one coin corresponds to one credit.

First, at S101 and S102, the same steps are performed as S21 and S22 in FIG. 12, respectively. At S103, based on coins inserted from the coin insertion slot 9 and bills inserted from the bill insertion slot 10, a coin/bill receiving process is performed to increase the owned credits.

Figure 19:
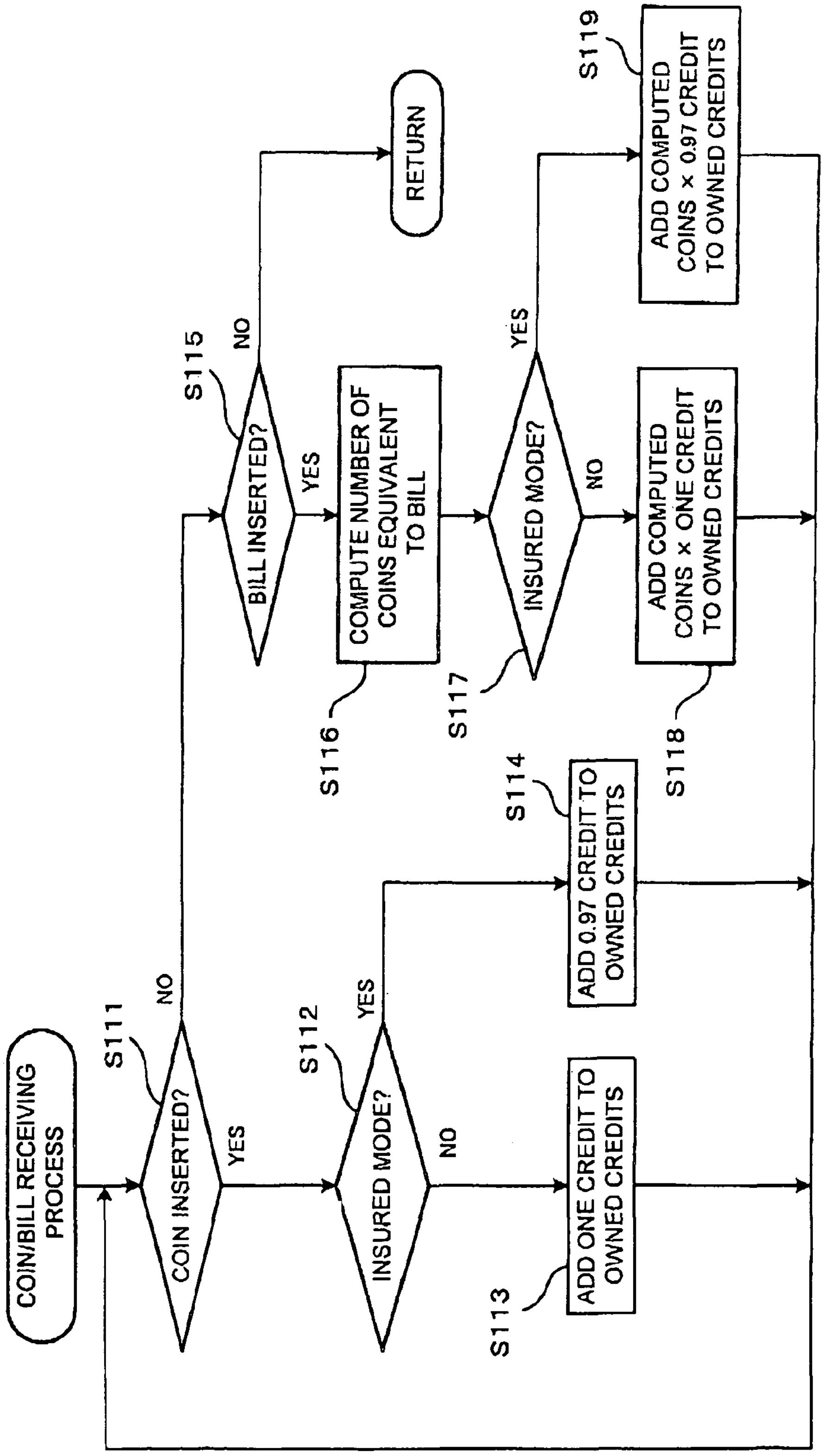
FIG. 19 is a flow chart of a coin/bill receiving process at S103 in FIG. 18.

Here, the coin/bill receiving process at S103 will be described with reference to FIG. 19.

First, at S111, the CPU 50 determines whether a coin is inserted based on the signal from the coin sensor 49. When it determines that a coin is inserted (S111: YES), it determines whether the game mode is in the insured mode (S112). When it is determined that the game mode is in the uninsured mode (S112: NO), one credit is added to owned credits the amount of which is stored in the owned credit data storage area 52A in the RAM 52 (S113). Then, in association with charge of the amount of credits, the numeric shown in the owned credits display part 12 is updated. After that, the process is returned to S111.

When it is determined that the game mode is in the insured mode (S112: YES), 0.97 credit is added to the owned credits the amount of which is stored in the owned credit data storage area 52A in the RAM 52 (S114). Subsequently, in association with change of the amount of owned credits, the numeric displayed on the owned credits display part 12 is updated. After that, the process is returned to S111.

When it is determined that no coin is inserted (S111: NO), the CPU 50 determines based on the signal from the bill sensor 67 at S115 whether a bill is inserted from the bill insertion slot 10. When it is determined that a bill is inserted (S115: YES), the CPU 50 computes the number of coins equivalent to the amount of the bill inserted (S116)

After that, at S117, it is determined whether the game mode is in the insured mode. When it is determined that the game mode is in the uninsured mode (S117: NO), credits equivalent to the coins computed at S116 are added to the owned credits as one coin is one credit (S118). Then, in association with change of the amount of owned credits, the numeric displayed on the owned credits display part 12 is also updated. After that, return to 111.

When it is determined that the game mode is in the insured mode (S117: YES), credits equivalent to the coins computed at S116 are added to the owned credits as one coin is 0.97 credit (S119). Then, in association with change of the amount of credits, the numeric displayed on the owned credits display part 12 is updated. After that, the process is returned to S111.

Figure 18:
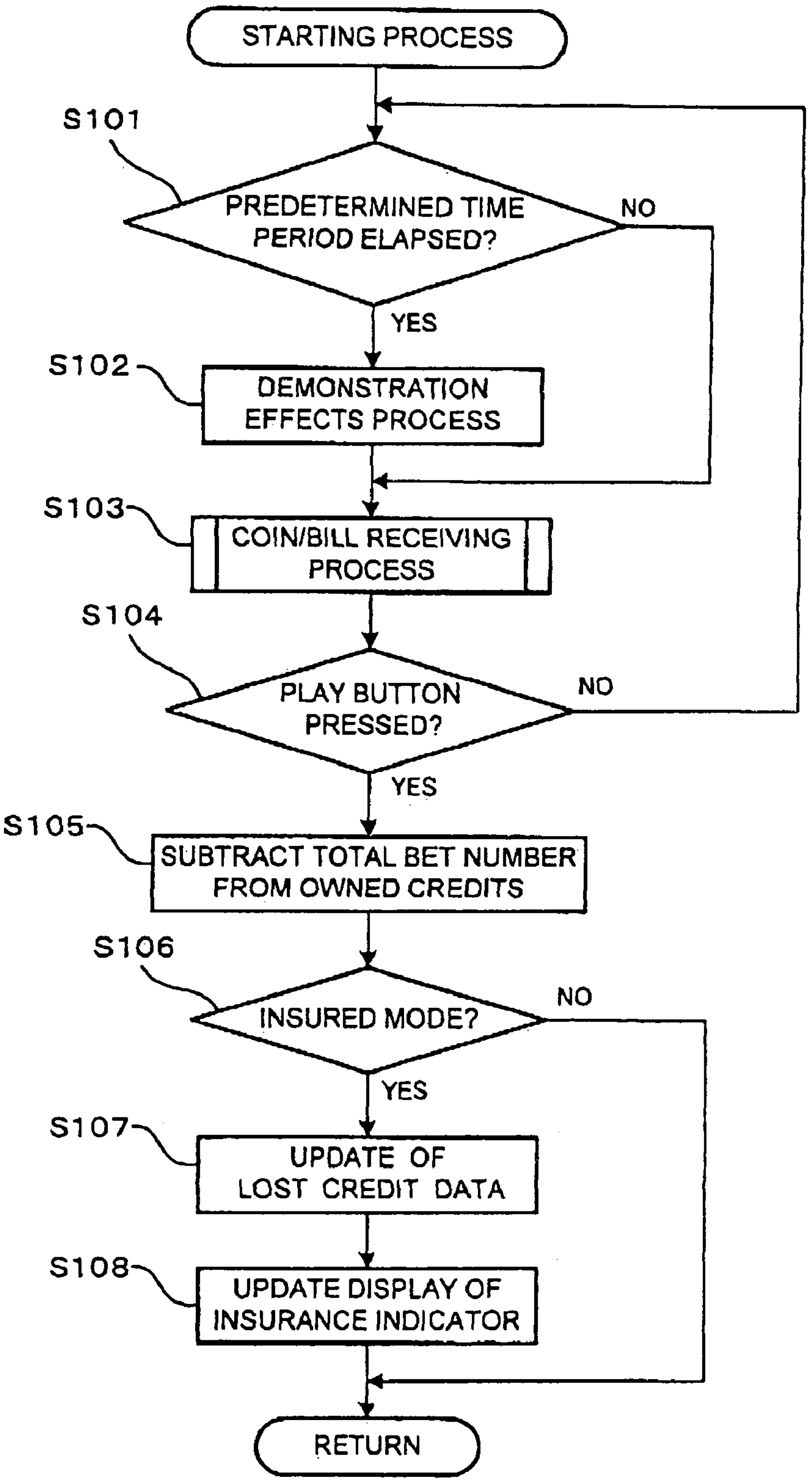
FIG. 18 is a flow chart illustrating an exemplary modification of the starting process shown in FIG. 12.

When it is determined that no bill is inserted (S115: NO), the coin/bill receiving process is ended to move to S104 in FIG. 18.

At S104, the same step is performed as S24 in FIG. 12. When it is determined that any one of the PLAY buttons 37 to 39 is not pressed (S104: NO), the process is returned to S101 to repeat the process described above. When it is determined that any one of the PLAY buttons 37 to 39 is pressed (S104: YES), the process is moved to S105 even during demonstration effects.

At S105, as similar to S26 in FIG. 12, the total bet number is subtracted from the owned credits (S105). At S106, as similar to S25 in FIG. 12, it is determined whether the game mode is in the insured mode. When it is determined that the game mode is in the uninsured mode (S106: NO), the starting process is ended.

When it is determined that the game mode is in the insured mode (S106: YES), the amount of lost credits stored in the lost credit data storage area 52B in the RAM 52 is read, the total bet number is added to the lost credits, and the lost credit data is updated (S107). At S108, as similar to S29 in FIG. 12, based on the lost credit data updated at S107, display of the insurance indicator 11 (see FIG. 4) is updated. After that, the starting process is ended.

Next, with reference to FIGS. 20 and 21, an exemplary modification of the internal lottery process shown in FIG. 13 will be described.

In the example shown in FIG. 13, five random numbers each corresponding to the video reels 21 to 25 are sampled by the random number sampling circuit 56 (see FIG. 6), and the symbols to be stopped on each of the video reels 21 to 25 are determined based on the code numbers corresponding to each of the random numbers (see FIG. 5). However, in the exemplary modification, a single random number is sampled to be used for directly determining the winning combination.

Figures 20, 21:
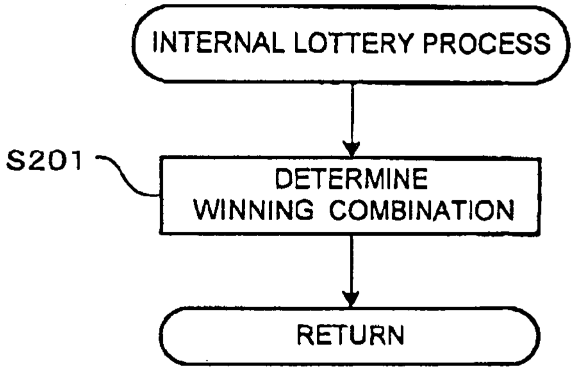
FIG. 20 is a flow chart illustrating an exemplary modification of the internal lottery process shown in FIG. 13.
FIG. 21 illustrates a lottery table for determining a winning combination at S201 in FIG. 20.

When the winning combination is determined at S201 in FIG. 20, a lottery table 101 shown in FIG. 21 is used. In the lottery table 101, the winning combinations are associated with the random numbers in a predetermined range. When the random number sampled by the random number sampling circuit 56 ranges within 0 to 49, it is determined that a player wins a bonus game. More specifically, it is determined that four or more of the symbol 'SARDINE' are stopped, not limited to on the activated line, in any of the stop areas of the video reels 21 to 25. When the random number ranges within 50 to 51, 52 to 57, 58 to 97, 98 to 177, 178 to 277, 278 to 477, 478 to 777, 778 to 1177, 1178 to 1577, 1578 to 1977, and 1978 to 2377, it is determined that the winning combinations of 'LOBSTER', 'SHARK', 'FISH', 'PUNK', 'OCTOPUS', 'CRAB', 'WORM', 'A', 'K', 'Q' and 'J' are made, respectively. When the random number ranges within 2378 to 2577, it is determined that the winning combination of 'SARDINE' is made. More specifically, it is determined that three of the symbol 'SARDINE' are stopped, not limited to on the activated line, in any of the stop areas of the video reels 21 to 25.

When the random number ranges within 2578 to 11999, it is determined that no winning combination is made, which means a miss.

Next, with reference to FIGS. 22A, 22B, 23, 24, and 25, a slot machine of a second embodiment of the gaming machine according to the invention will be described.

The compensation function that compensates for a loss due to games works when the amount of lost credits reaches the upper limit so that, in the first embodiment, a predetermined number of credits are paid out in the first embodiment, while in the second embodiment, it works so that a player compulsorily wins a mystery bonus game as described below.

In the embodiment, in addition to the bonus game shown in FIG. 15 as described above (hereinafter, in the embodiment, it is called 'a basic bonus game'), a so-called mystery bonus game is performed. Usually, the basic bonus game is started when the bonus winning combination of symbols disclosed to a player is made. On the other hand, the mystery bonus game is started when a mystery bonus game winning combination not disclosed to a player is made. Here, 'being disclosed' means that information is given to a player as determined information by displaying it on display 3 or 4, for example. Such information is given to a player from a party who knows, based on authenticated authority, information such as determination logic for the CPU 50 stored in the slot machine 1, e.g., developers, manufacturers and venders of the slot machine 1, or from a party who knows the information through permission from that party, e.g., owners and operators at a game shop, a game arcade, and a casino where the slot machine 1 is placed. In reverse to the meaning of 'being disclosed', 'not being disclosed' means that information is not given as determined information.

As similar to the basic bonus game, the mystery bonus game is a game usually advantageous for a player, and the game contents are the same as those of the basic bonus game. That is, during the mystery bonus game, so-called free games are played so that a series of 15 to 25 games are continuously played in accordance with the result of an internal lottery without betting-credits. Further, as similar to the basic bonus game, in the mystery bonus game, the bet number and the activated lines when shifted to the game are applied. Furthermore, the winning combination and its payout number in the mystery bonus game are the same in those in the basic bonus game described above. Thus, the symbol 'SHARK' shown in FIG. 9 is treated as the symbol 'LOBSTER', and the free game number is increased when four of the symbol 'SARDINE' in total are stopped on any of the stop areas of the video reels 21 to 25. Therefore in the mystery bonus game, as similar to the basic bonus game, the player can suppress use of credits and is likely to obtain many credits.

In the embodiment, depending on whether the game mode is either in the uninsured mode or the insured mode, the mystery bonus game winning combination is varied (see FIG. 22A and 22B)

When the game mode is in the uninsured mode, patterns A, B and C shown in FIG. 22A are applied as the mystery bonus game winning combinations. When any of the patterns A to C is made, a mystery bonus game is started. The pattern A means that the symbols 'LOBSTER', 'FISH', 'CRAB', and, 'SHARK' are continuously stopped on the activated line from the left end, the pattern B means that the symbols 'OCTOPUS' 'PUNK', 'WORM', and 'A' are continuously stopped on the activated line from the left end, and the pattern C means that the symbols A', 'K', 'Q', and 'J' are continuously stopped on the activated line from the left end.

When the game mode is in the insured mode, patterns D, E and F shown in FIG. 22B are applied as the mystery bonus game winning combinations. When any of the patterns D to F is made, a mystery bonus game is started. The pattern D means that the symbols 'LOBSTER', 'FISH', and 'CRAB' are continuously stopped on the activated line from the left end, the pattern B means that the symbols 'OCTOPUS', 'PUNK', and 'WORM' are continuously stopped on the activated line from the left end, and the pattern C means that the symbols 'A', 'K', and 'Q' are continuously stopped on the activated line from the left end.

In other words, the symbols to be stopped on the video reel 25 is not specified in the uninsured mode, while the symbols to be stopped on the video reels 24 and 25 are not specified in the insured mode. Thus, in the insured mode, types of mystery bonus winning combinations are more than that in the uninsured mode, so that a probability of winning a mystery bonus game is higher than that in the uninsured mode. Further, as described below, when the amount of lost credits reaches the upper limit in the insured mode, a player compulsorily wins a mystery bonus game (see FIG. 25) to compensate for the player's loss.

Next, with reference to FIG. 23, a main process in the embodiment will be described.

It is different from that of the first embodiment in FIG. 10 in that after a base game process at S4, not the bonus game process at S5 but a basic bonus game process at S7 and a mystery bonus game process at S8 are performed, and in that the loss compensation process S6 is omitted. Furthermore, the contents of a game mode switching process at S10 and an internal lottery process at S9 are different. Hereinafter, the differences from the first embodiment will be described. Each program shown in flow charts in FIGS. 23 to 25 is stored in the ROM 51 and/or the RAM 52 of the slot machine 1, and is run by the CPU 50.

Figure 24:
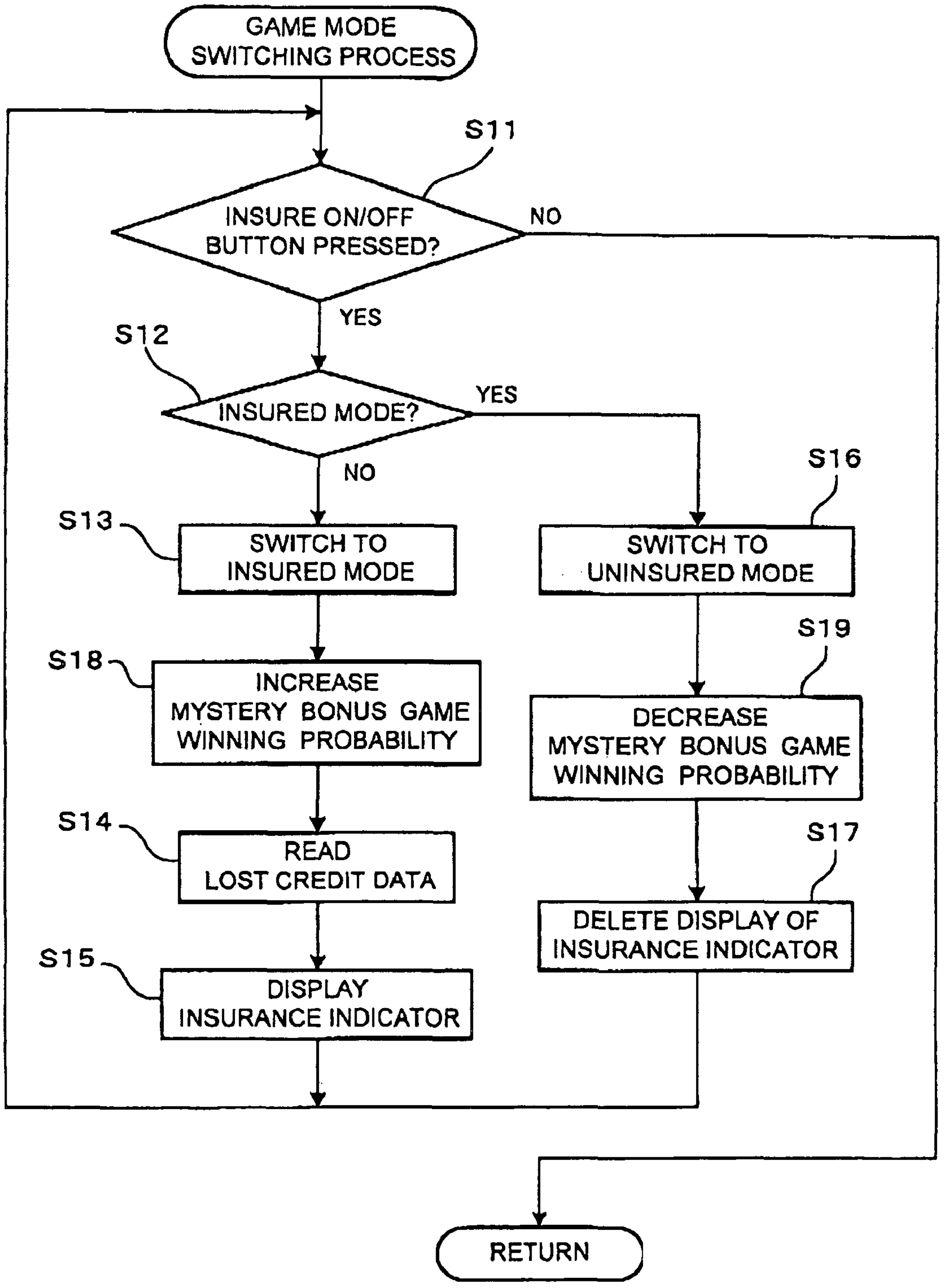
FIG. 24 is a flow chart of a game mode switching process at S10 in FIG. 23.

The game mode switching process at S10 is shown in FIG. 24. The difference from FIG. 11 is in that the probability of winning the mystery bonus game is increased (S18) after the game mode is switched to the insured mode at S13 and before credit data is read (S14), and that the probability of winning the mystery bonus game is decreased (S19) after the game mode is switched to the uninsured mode at S16 and before display of the insurance indicator 11 is deleted (S17). Here, in order to increase the probability of winning the mystery bonus game, not the combinations shown in FIG. 22B but the combinations shown in FIG. 22A are applied as the mystery bonus game winning combinations. On the other hand, in order to decrease the probability of winning the mystery bonus game, not the combinations shown in FIG. 22A but the combinations shown in FIG. 22B are applied as the mystery bonus game winning combination.

Figure 25:
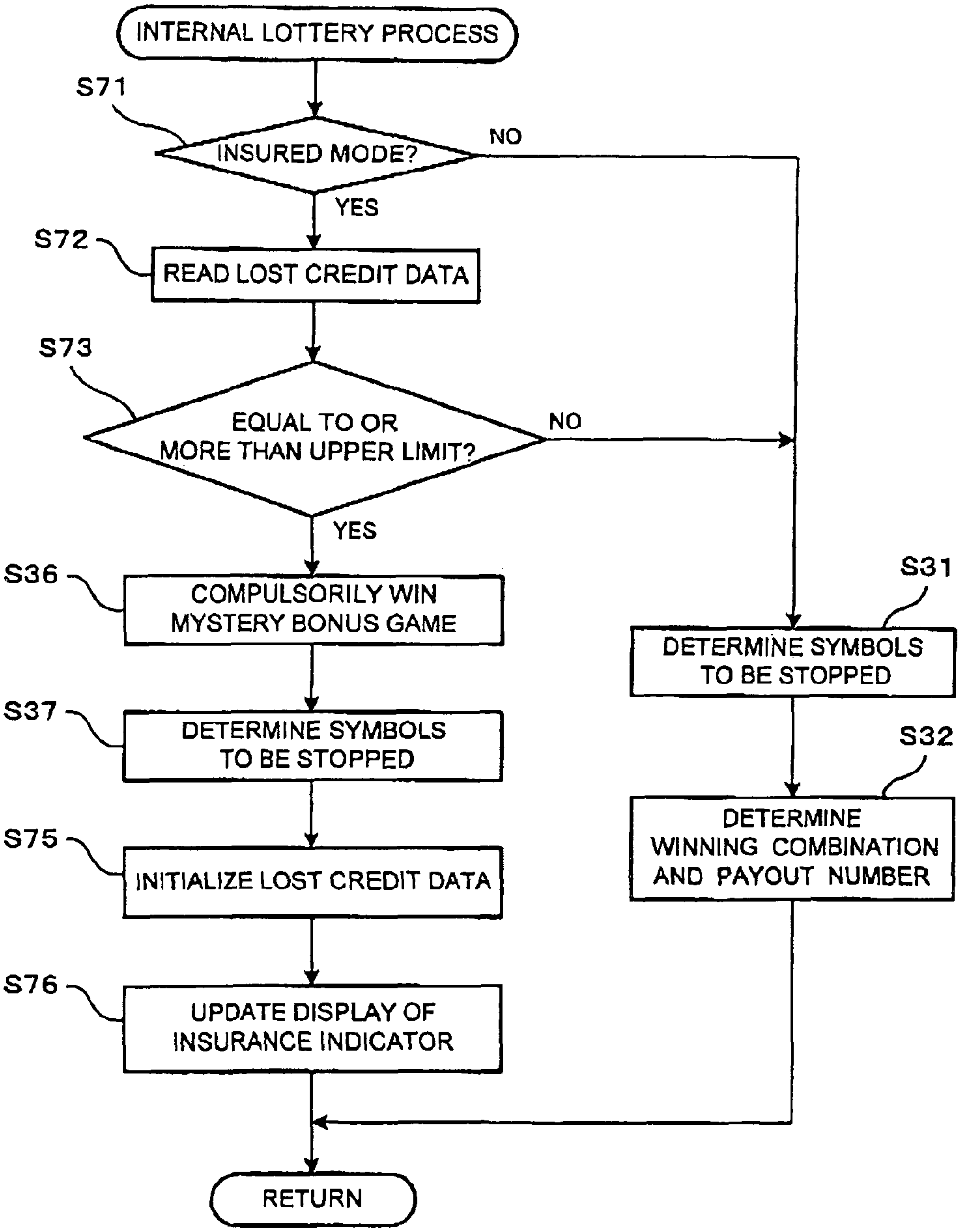
FIG. 25 is a flow chart of an internal lottery process at S9 in FIG. 23.

The internal lottery process at S9 is shown in FIG. 25. First, as same as S71 in the loss compensation process shown in FIG. 16, it is determined whether the game mode is in the insured mode. When it is determined that the game mode is in the uninsured mode (S71: NO), the same steps are performed as S31 and S32 shown in FIG. 13. Here, at S32, the mystery bonus game winning combinations shown in FIG. 22A, in addition to the table in FIG. 9, are referenced to determine a winning combination and its payout number.

When it is determined that the game mode is in the insured mode (S71: YES), the same steps of S72 and S73 as in the loss compensation process shown in FIG. 16 are performed. When it is determined that the amount of lost credits is less than the upper limit (S73: NO), the same steps are performed as S31 and S32 shown in FIG. 13.

When it is determined that the amount of lost credits is equal to or more than the upper limit (S73: YES), instead of paying out credits in FIG. 16 (S74), it is determined to compulsorily win the mystery bonus game (S36). Then, at S37, the symbols to be stopped on the video reels 21 to 25 are determined so as to make the mystery bonus game winning combination shown in FIG. 22B. After that, the same steps are performed as S75 and S76 in the loss compensation process shown in FIG. 16.

Figure 23:
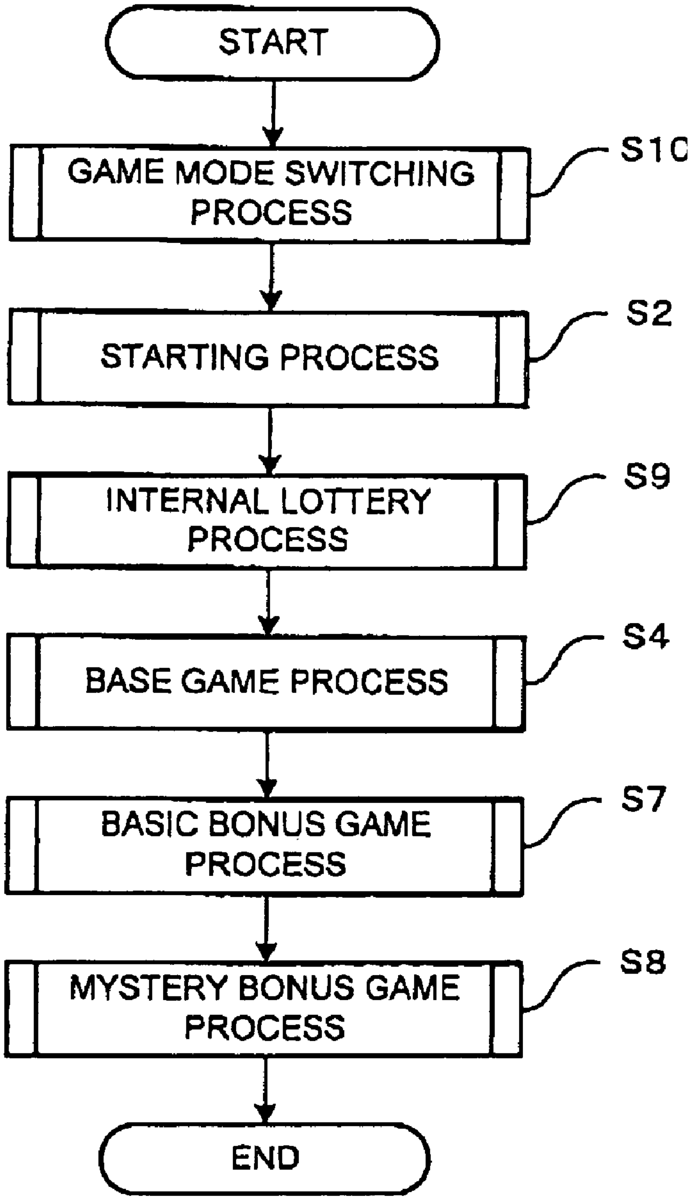
FIG. 23 is a flow chart of a main process performed in a slot machine according to a second embodiment of a gaming machine of the invention.

Each of the basic bonus game process at S7 and the mystery bonus game process at S8 shown in FIG. 23 is substantially the same process as the bonus game process in the first embodiment described above (see FIG. 15). In other words, the phrase 'the bonus game' in FIG. 15 can be replaced by 'the basic bonus game' and 'the mystery bonus game', respectively, and thus the descriptions of the bonus game process at S7 and at S8 will be omitted herein.

When the mystery bonus game winning combination is made during the basic bonus game, the game may be shifted to the mystery bonus game.

As described above, according to the embodiment, when made is the combination of symbols that is not disclosed to a player, i.e., the combination that the player regards as a miss, the player wins the mystery bonus game at unexpected timing. Therefore, the player's expectations for games can be increased, and the player can be prevented from being board with games.

Next, with reference to FIGS. 26A, 26B, and 27, an exemplary modification of the second embodiment will be described.

In the second embodiment, at S31 in the internal lottery process (see FIG. 25), five random numbers are sampled each corresponding to the video reels 21 to 25 by the random number sampling circuit 56 (see FIG. 6), and the symbols to be stopped on each of the video reels 21 to 25 are determined based on the code number corresponding to each of the random numbers (see FIG. 5). On the other hand, in the exemplary modification, a single random number is sampled to be used for directly determining the winning combination.

Here, whether or not to win the mystery bonus game is determined by using the lottery table 102 or 103 (see FIGS. 26A and 26B). The lottery table used is varied depending on whether the game mode is either in the uninsured mode or the insured mode. In the insured mode, the random numbers for winning a bonus game are more than that in the uninsured mode. Therefore, as similar to the second embodiment described above, in the insured mode a probability of winning the mystery bonus game is higher than that in the uninsured mode.

In the exemplary modification, at S18 in the game mode switching process (see FIG. 24), the table is changed from the table 102 shown in FIG. 26A to the table 103 shown in FIG. 26B in order to increase the probability of winning the mystery bonus game. At S19, the table is changed from the table 103 shown in FIG. 26B to the table 102, shown in FIG. 26A in order to decrease the probability of winning the mystery bonus game.

At S31 in the internal lottery, process (FIG. 25), the table 101 in FIG. 21 and the table 102 in FIG. 26A or the table 103 in FIG. 26B are referenced.

Next, with reference to FIGS. 27A, 27B, 27C, 28, 29, and 30, a slot machine of a third embodiment of the gaming machine according to the invention will be described.

The compensation function that compensates for a loss due to games in the embodiment is to increase the winning probability, not to pay out credits in the first embodiment, or not to compulsorily win the mystery bonus game in the second, embodiment. More specifically, in the embodiment, the winning probability is increased by changing the reel bands displayed on the video reels 21 to 25 to those more including advantageous symbols such as the symbols 'SARDINE' and 'WILD'.

In the embodiment, in addition to the uninsured mode and the insured mode, a high probability mode is provided. When the amount of lost credits reaches the upper limit in the insured mode, the game mode is switched to the high probability mode, and that game mode is maintained until a predetermined ending condition is satisfied. Depending on the modes, the reel bands displayed on the video reels 21 to 25 are varied.

In the uninsured mode, as similar to the first embodiment, the first reel band 111 to the fifth reel band 115 shown in FIG. 5 are applied to the video reels 21 to 25, respectively (see FIG. 27A). In the insured mode, a sixth reel band 116 is applied to the video reel 21 instead of the first reel band 111, and the second reel band 112 to the fifth reel band 115 are applied to the remaining video reels 22 to 25, respectively (see FIG. 27B). In the high probability mode, a seventh reel band 117 is applied to the video reel 21 instead of the first reel band 111 or the sixth reel band 116, and the second reel band 112 to the fifth reel band 115 are applied to the remaining video reels 22 to 25, respectively (see FIG. 27C).

As shown in FIG. 28, as compared with the first reel band 111 (see FIG. 5), the sixth reel band 116 more includes the symbols 'WILD' and 'SARDINE'. More specifically, the first reel band 111 includes only two symbols 'WILD', whereas the sixth reel band 116 includes four symbols. Furthermore, the first reel band 111 includes only one symbol 'SARDINE', whereas the sixth reel band 116 includes three symbols.

Moreover, as compared with the first and the sixth reel bands 111 and 116, the seventh reel band 117 more includes the symbols 'WILD' and 'SARDINE'. More specifically, the first and the sixth reel bands 111 and 116 include two and four symbols 'WILD', respectively, whereas the seventh reel band 117 includes eight symbols. Besides, the first and the sixth reel bands 111 and 116 include one and three of the symbol 'SARDINE', respectively, whereas the seventh reel band 117 includes five of the symbol 'SARDINE'.

Having more symbols 'WILD', which is a substitute of the symbols other than the symbol 'SARDINE', raises the probability of making any of the winning combination in FIG. 9. Further, having more symbols 'SARDINE' raises the probability of obtaining the payout number. The symbol 'SARDINE' is a scatter symbol so that stopping two or more of the symbol 'SARDINE' in total in any of the stop areas of the video reels 21 to 25, not limited to the activated line, results in a predetermined payout number. Moreover, since the symbol 'SARDINE' is also a trigger symbol for the shift to the bonus game, having more symbols 'SARDINE' raises the probability of winning the bonus game.

That is, a player can obtain much more payout numbers by the same bet number in the insured mode than in the uninsured mode, or in the high probability mode than in the insured mode and the uninsured mode.

In the slot machine of the embodiment, the same main process is performed as that in FIG. 10. However, it should be noted that when the symbols to be stopped are determined in the internal lottery process at S3 (see S31 in FIG. 13), the reel bands corresponding to each mode are used (see FIG. 27A to FIG. 27C). In addition, the loss compensation process S6 is different from that in FIG. 16.

Here, with reference to FIG. 29, the loss compensation process at S6 performed in the slot machine of the embodiment will be described.

First, the same step is performed as S71 in FIG. 16. When it is determined that the game mode is in the uninsured mode (S71: NO), the loss compensation process is ended. When it is determined that the game mode is in the insured mode (S71: YES), it is determined whether or not the game mode is set in the high probability mode (S172). When it is determined that the game mode is in the high probability mode (S172: NO), the same steps are performed as S72 and S73 in FIG. 16. When it is determined that the amount of lost credits is less than the upper limit (S73: NO), as similar to the process in the first embodiment in FIG. 16, the loss compensation process is ended.

When it is determined that the amount of lost credits is equal to or more than the upper limit (S73: YES), the game mode is switched to the high probability mode (S175). After that, the same steps are performed as those at S75 and S76 in FIG. 16, and the loss compensation process is ended.

When it is determined that the game mode is in the high probability mode (S172: YES), it is determined whether the ending condition is satisfied (S173). The ending condition may be a condition where the number of performed games after the high probability mode is set reaches 20 games, a predetermined time period has elapsed after the high probability mode is set, a predetermined number of credits paid out after the high probability mode is set, or the payout rate reaches a predetermined value, e.g., 90%. The ending condition may be various not limited to the above.

When it is determined that the ending condition is satisfied (S173: YES), the game mode is switched from the high probability mode to the insured mode (S174). After that, the process is moved to S72 to perform the same steps described above. When it is determined that the ending condition is not satisfied (S173: NO), the loss compensation process is ended while the game mode is maintained in the high probability mode.

In the third embodiment, a single random number may be sampled, not sampling five random numbers corresponding to the respective video reels 21 to 25, to be used for directly determining the winning combination as in the above modification. The lottery table may be varied depending on the modes.

For example, the lottery table 101 in FIG. 21 is used in the uninsured mode, and a lottery table 104 in FIG. 30 is used in the insured mode. In the lottery table 104, the random numbers for the winning combination are more than that in the lottery table 101, so that the winning probability is increased. In the high probability mode, such a lottery table is used as the random numbers for the winning combination are much more than that in the lottery table 104 of the insured mode, so that the winning probability is further increased.

Next, with reference to FIGS. 31, 32, 33, 34, and 35, a slot machine of a fourth embodiment of the gaming machine according to the invention will be described.

In the fourth embodiment, the mystery bonus game described in the second embodiment is played, and a special mode, where the probability of winning the mystery bonus game is further increased, as well as the uninsured mode and the insured mode is provided.

As the mystery bonus game winning combinations, combinations shown in FIGS. 22A and 22B are applied in the uninsured mode and the insured mode, respectively, and the patterns G, H and I in FIG. 31 are used in the special mode. In the patterns G, H and I, symbols to be stopped on the video reels 23, 24 and 25 are not specified. Thus, in the special mode, types of mystery bonus winning combinations are more than that in the uninsured mode and the insured mode, so that a probability of winning a mystery bonus game is higher than that in the uninsured made and the insured mode.

The main process in the fourth embodiment shown in FIG. 32 is similar to the main process of the second embodiment (see FIG. 23), but different in that a loss compensation process at S406 is performed after the mystery bonus game process at S8, and in that the internal lottery process at S3 which is the same as that in the first embodiment is performed instead of the internal lottery process at S9 in FIG. 23 in the second embodiment.

In the loss compensation process at S406, as shown in FIG. 33, first, the same step is performed as S71 in FIG. 16. When it is determined that the game mode is in the uninsured mode (S71: NO), the loss compensation process is ended. When it is determined that the game mode is in the insured mode (S71: YES), it is determined whether the game mode is in the special mode (S272). When it is determined that the game mode is not in the special mode (S272: NO), the same steps are performed as S72 and S73 in FIG. 16. When it is determined that the amount of lost credits is less than the upper limit (S73: NO), as similar to the first embodiment shown in FIG. 16, the loss compensation process is ended.

When it is determined that the amount of lost credits is equal to or more than the upper limit (S73: YES), the game mode is switched to the special mode (S275). After that, the same steps are performed as S75 and S76 in FIG. 16, and then the loss compensation process is ended.

When it is determined that the game mode is in the special mode (S272: YES), it is determined whether the ending condition is satisfied (S273). The ending condition may be a condition where a player wins the mystery bonus game at this game, the number of performed games after the special mode is set reaches a predetermined number, a predetermined time period has elapsed after the special mode is set, a predetermined number of credits is paid out after the special mode is set, or a payout rate reaches a predetermined value, e.g., 90%. The ending condition may be various not limited to the above.

When it is determined that the ending condition is satisfied (S273: YES), the game mode is switched from the special mode to the insured mode (S274). After that, the process is moved to S72 to perform the same steps described above. When it is determined that the ending condition is not satisfied (S273: NO), the loss compensation process is ended while the game mode is maintained in the special mode.

In the fourth embodiment, a single random number may be sampled, not sampling five random numbers each corresponding to the video reels 21 to 25, to be used for directly determining the winning combination. The lottery table may be varied depending on the modes. For example, the lottery tables 102 and 103 in FIGS. 26A and 26B may be used in the uninsured mode and the insured mode, respectively, and a lottery table 105 in FIG. 34 may be used in the special mode to determine whether a player wins the mystery bonus game. The lottery table 105 in FIG. 34 has random numbers for the win more than that in the lottery tables 102 and 103. Therefore, in the special mode a probability of winning 'the mystery bonus game ' is higher than that in the uninsured mode and the insured mode.

In addition, the mystery bonus game may have the game contents different from the basic bonus game. For example, the symbols to be displayed on the video reels 21 to 25 and the winning combination of symbols may be changed so that the mystery bonus game is more advantageous for a player than the basic bonus game.

The mystery bonus game winning combination is not limited to FIGS. 22A and 22B, as long as not disclosed to the player. For example, it is not limited to stopping on the activated line as shown in FIGS. 22A and 22B. A player may win the mystery bonus game when predetermined symbols are stopped on the stop areas of the video reels 21 to 25 by a predetermined number or greater. In addition to this, various mystery bonus game winning combinations can be applied.

Next, with reference to FIGS. 35, 36, 37, and 38, a slot machine 150 of a fifth embodiment of the gaming machine according to the invention will be described. Hereinafter, the same components as those of the slot machine 1 in the first embodiment are assigned the same numerals and signs, omitting the description.

As shown in FIG. 35, the slot machine 150 of the embodiment has a card insertion slot 156, which is formed on the front of the control panel 6 and into which a member card 151 is inserted. Adjacent to the card insertion slot 156 in the cabinet 2, a card sensor 153 for detecting the member card 151 and a card reader 154 for reading data recorded on the member card 151 are disposed (see FIG. 36)

In the embodiment, it is determined whether a player is a member based on information recorded on the member card 151. Only when the player is identified as a member, the game mode can be switched through the INSURE ON/OFF button 13. A player inputs his/her personal data such as name and address for member registration through a dedicated terminal placed in a game shop or over the Internet, so as to obtain the member card 151 which is issued with an ID number recorded thereon. The member card 151 may be IC card having an IC tag built therein, a magnetic card having a magnetic strip, or the like.

Next, with reference to FIG. 36, a control unit of the slot machine 150 will be described.

The control unit of the slot machine 150 is substantially the same as the control unit of the slot machine 1 of the first embodiment (see FIG. 6), but it further has the card sensor 153, the card reader 154, and a communication circuit 155 for the communication with a server (not shown) which is placed in the same game shop. The control unit of the slot machine 150 has RAM 152 different from the RAM 52 in the first embodiment. As shown in FIG. 37, the RAM 152 further includes a member ID storage area 52D which stores the ID numbers of all the members of a game shop in addition to the RAM 52 of the first embodiment (see FIG. 8).

The card sensor 153, the card reader 154, and a communication circuit 155 are connected to a CPU 50. The CPU 50 receiving a card detection signal from the card sensor 153 determines whether a player is a member, based on the member ID number read by the card reader 154 and on data stored in the member ID storage area 52D in the RAM 152 (see FIG. 37).

The communication circuit 155 receives the ID number of a member who is newly registered and the ID number of a member who is deleted because withdrawal from membership from the server, for example, every time when a game is started, and then updates the data stored in the member ID storage area 52D.

Next, with reference to FIG. 38, the game mode switching process at S1 in FIG. 10 of the slot machine 150 will be described.

In the embodiment, prior to S11 in the game mode switching process of the first embodiment (see FIG. 11), it is determined whether the member card 151 is inserted into the card insertion slot 156 (S301) and member identification is performed (S302). At S301, determination is made based on whether or not to receive the card detection signal from the card sensor 153. When it is determined that the member card 151 is inserted (S301: YES), the CPU 50 references to data on the member card 151 which is read by the card reader 154 and to the member ID storage area 52D in the RAM 52, and determines whether a player is a member (S302). When the member ID number recorded on the member card 151 is stored in the member ID storage area 52D in the RAM 52, it is determined that the player is a member.

When it is determined that the member card 151 is not inserted into the card insertion slot 156 (S301: NO) or it is determined that the player is not a member (S302: NO), the game mode switching process is ended. Then, the process is returned to the main process to move to the starting process (S2) in FIG. 10. In this case, in order to avoid permitting a non-member player to play games in the insured modes the game mode is switched to the uninsured mode if it is set in the insured mode. Thus, the following can be avoided: a member player plays games on a slot machine 150 and finishes a game in the insured mode remained, and another player who is not a member subsequently plays games on the gaming machine 150 in the insured mode.

When it is determined that the player is a member (S302: YES), the process is moved to S303. S303 to S309 are the same as S11 to S17 in FIG. 11, omitting the description.

As described above, according to the slot machine 150 of the embodiment, since only the player who is a member of the game shop can make selection of the insured mode or the uninsured mode, services for members can be improved. Besides, willingness for member registration can be provoked to nonmember players.

Next, with reference to FIGS. 39, 40, and 41, an embodiment of a game system of the invention will be described. Hereinafter, the same components as those described in the embodiments described above are assigned the same numeral and signs, omitting the description.

A game system 200 of the embodiment includes slot machines 250 and a server 201 that is connected in communication with the slot machines 250 via a network 210. The network 210 may be LAN (Local Area Network), WAN (Wide Area Network), a dedicated communication network, the Internet, or the like. The server 201 and the slot machines 250 may be placed in the same game shop.

The slot machine 250 having a communication circuit 155 has substantially the same configuration as that of the slot machine 150 of the fifth embodiment described above, but is different from the slot machine 150 in that RAM does not have the member ID storage area 52D. In the fifth embodiment, the RAM 152 of the slot machine 150 has the member ID storage area 52D, and the CPU 50 of the slot machine 150 performs member identification. However, in the embodiment, the server 201 having a member information DB 206 which stores the ID numbers of all the members of the game shop performs the member identification.

A control unit of the server 201 is configured as a CPU 203 is centered. The CPU 203 is connected to ROM 204 and RAM 205. The ROM 204 stores a member identification program (see FIG. 41) which is described below, various programs necessary to control the server 201, data tables, and the like. The RAM 205 is a memory for temporarily storing various data computed by the CPU 203.

The server 201 further has the member information DB 206 and a communication circuit 207. The communication circuit 207 communicates with each of the slot machines 250 to receive the member ID number sent from a communication circuit 155 of the slot machine 250. The CPU 203 references to the member ID number received by the communication circuit 207 and the member information DB 206 for member identification. The identification result is sent to the corresponding slot machine 250 via the communication circuit 207.

Next, with reference to FIG. 40, the game mode switching process (S1 in FIG. 10) in the slot machine 250 will be described.

At S401, as similar to S301 in FIG. 38, the CPU 203 determines whether the member card 151 is inserted into the card insertion slot 156. When it is determined that the member card 151 is inserted (S401: YES), the CPU 203 sends the member ID number read by the card reader 154 to the server 201 via the communication circuit 155 (S402).

At S403, the communication circuit 155 receives the result of member identification by the server 201, details of which is described below, (see FIG. 41). Then, based on the result, it is determined whether a player is a member (S404).

When it is determined that the member card 151 is not inserted into the card insertion slot 156 (S401: NO) or it is determined that the player is not a member (S404: NO), the game mode switching process is ended to return to the starting process (S2) of the main process shown in FIG. 10. However in this case, as similar to the slot machine 150 described above, in order to avoid permitting a non-member player to play games in the insured mode, the game mode is switched to the uninsured mode when it is set in the insured mode.

When the player is identified as a member (S404: YES), the process is moved to S405. S405 to S411 are the same as S11 to S17 in FIG. 11, respectively, omitting the description.

Next, with reference to FIG. 41, member identification performed in the server 201 of the game system 200 will be described.

First, at S421, it is determined whether the member ID number, which is sent from the slot machine 250 at S402 (see FIG. 40), is received. When it is determined that the member ID number is not received (S421: NO), wait until it is sent. When it is determined that the member ID number is received (S421: YES), the process is moved to S422.

At S422; it is determined whether the received number is matched with any one of the numbers stored in the member information DB 206. When it is determined that the received number is matched with one of the numbers stored in the member information DB 206 (S422: YES), the identification result indicating that the player is a member is sent to the slot machine 250 (S423). When it is determined that the received number is not matched with any one of the numbers stored in the member information DB 206 (S422: NO), the identification result indicating that the player is not a member is sent to the slot machine 250 (S424).

As described above, according to the game system 200 of the embodiment, as similar to the first to fourth embodiments, a player can select whether or not to apply the compensation function by his/her intention through the INSURE ON/OFF button 13 on the slot machine 250. Thus, player's satisfaction can be increased.

Furthermore, as similar to the fifth embodiment, since only a member player of the game shop can make selection of the insured mode or the uninsured mode, services for members can be improved. Besides, willingness for member registration can be provoked to non-member players.

The slot machines 250 may be grouped to provide the server 201 for each group.

At S83 (see FIG. 17), a receipt on which the amount of coins to be paid out is written may be ejected instead of payout of coins. In this case, the receipt may be exchanged with a prize at, for example, a counter in the game shop.

The number of credits collected as an insurance fee at S27 in the first embodiment (see FIG. 12) is not limited to one credit. For example, it may be two credits or five credits. Furthermore, the rate for collecting an insurance fee in the example in FIG. 19 is not limited to 3%.

Credits may be paid out when the payout rate is equal to or less than a predetermined rate, for example, not when the amount of lost credits reaches the upper limit. In this case, the payout rate may be displayed on the insurance indicator 11.

Lost credit data is initialized at S84 in FIG. 17 in accordance with pressing the COLLECT button 31, but which is not limited thereto. For example, an infrared sensor may be placed on the front of the slot machines 1, 150 and 250 to detect that the player is gone i.e., the change of player, so that the lost credit data is initialized.

In the bonus game and the mystery bonus game, instead of free games, a selective game may be played that moves by selecting options displayed on the display 3 or 4.

The gaming machine according to the invention is not limited to the slot machine using the video reels 21 to 25, which can be applied to gaming machines such as a slot machine using mechanical reels, a pachi-slot machine, and a pachinko machine other than the slot machine.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A gaming machine comprising:

a receiving unit that receives game media as a game value for purchasing games played on the gaming machine;

a payout unit that pays out game media;

a memory storing an owned game value, as a sum value, and a net lost game value that a player has lost;

an operation unit that receives a first operation input that is input by the player;

a COLLECT button that receives a second operation input that is input by the player; and a game control unit:

controlling the gaming machine and execution of a game played on the gaming machine, and switching the gaming machine between an insured game mode and an uninsured game mode of operation of the gaming machine in response to the first operation input by the player to the operation unit, the insured game mode including a compensation function compensating the player for an excessive net loss incurred in playing the gaming machine and the uninsured game mode not providing the compensation function, wherein the game control unit initializes the net lost game value upon input of the second operation input that is input by the player to the COLLECT button, controls the payout unit to pay out a quantity of game media corresponding to a predetermined game value, based on the game value received by the receiving unit and results of the game last played on the gaming machine, and when the gaming machine is in the insured game mode, for each individual game played on the gaming machine, subtracts both the game value received by the receiving unit and an insurance premium value required to play the given individual game in the insured game mode from the sum value stored in the memory, adds the game value received by the receiving unit to the net lost game value stored in the memory and subtracts a value, corresponding to the quantity of game media that the payout unit has paid out, from the net lost game value stored in the memory, determines whether the net lost game value stored in the memory has reached an excessive net loss value, and awards an insurance value to the player if the net lost game value stored in the memory has reached the excessive net loss value and, upon awarding of the insurance value, initializes the net lost game value without any input from the player; and when the gaming machine is in the uninsured game mode, for each individual game played on the gaming machine, subtracts the game value received by the receiving unit from the sum value stored in the memory but does not subtract the insurance premium value from the sum value stored in the memory.

2. The gaming machine according to claim 1, wherein the game control unit awards, as the insurance value, a game value added to the sum value stored in the memory.

3. The gaming machine according to claim 1, further comprising:

a game display unit that displays a plurality of symbols that vary in playing a game on the gaming machine; and a stop control unit that controls stopping of the symbols displayed on the game display unit, wherein the quantity of game media paid out by the payout unit is paid out only when a winning combination of symbols is displayed stopped on the game display unit, and the game control unit awards, as the insurance value, an increased probability of displaying a winning combination in a game to be played on the gaming machine.

4. The gaming machine according to claim 1, wherein the game control unit awards, as the insurance value, a bonus game played on the gaming machine.

5. The gaming machine according to claim 1, further comprising:

a game display unit that displays a plurality of symbols that vary in playing a game on the gaming machine; and a stop control unit that controls stopping of the symbols displayed on the game display unit, wherein the quantity of game media paid out by the payout unit is paid out only when a winning combination of symbols is displayed stopped on the game display unit, and the game control unit awards, as the insurance value, an increased number of winning combinations of the symbols in a game to be played on the gaming machine.

6. The gaming machine according to claim 1, further comprising:

a detecting unit that detects when the player of a gaming machine changes; and an initializing unit that resets the net lost game value stored in the memory when the detecting unit detects a change in players of the gaming machine.

7. The gaming machine according to claim 1, further comprising:

a player identification unit that receives personal data identifying a player of the gaming machine; and a member identification unit that determines from the personal data received whether the player has been registered as a member, wherein the game control unit switches the game mode when a player is identified as a member.

8. The gaming machine according to claim 1, further comprising an image display unit which displays an image, wherein the game control unit controls the image display unit, when the gaming machine is operating in the insured mode, to provide a display of the net lost game value that is stored in the memory and the excessive net loss value on the display unit.

9. The gaming machine according to claim 8, wherein the game control unit controls the image display unit, when the gaming machine is operating in the uninsured mode, to provide no display of the net lost game value that is stored in the memory and the excessive net loss value on the image display unit.

10. The gaming machine according to claim 8, wherein the game control unit controls the display unit so that the net lost game value that is stored in the memory and the excessive net lost game value are displayed on a graph.

11. A gaming machine comprising:

a receiving unit that receives game media as a game value for purchasing games played on the gaming machine;

a payout unit that pays out game media;

a memory storing an owned game value, as a sum value, and a net lost game value that the player has lost;

an operation unit that receives a first operation input that is input by the player;

a COLLECT button that receives a second operation input that is input by the player;

a card reader that reads information from a membership card issued to a player who is a member of a group, the information read indicating that the player is a member; and a game control unit:

controlling the gaming machine and execution of a game played on the gaming machine, and only when the information read from a card by the card reader indicates that the player is a member, permitting switching of the gaming machine between an insured game mode and an uninsured game mode of operation of the gaming machine in response to the first operation input that is input by the player to the operation unit, the insured game mode including a compensation function compensating the player for an excessive net loss incurred in playing the gaming machine and the uninsured game mode not providing the compensation function, wherein the game control unit, initializes the net lost game value when a card is inserted into the card reader and (i) no information is read from the card by the card reader or (ii) the information read from the card by the card reader indicates the player is not a member, and the second operation input is input by the player to the COLLECT button, controls the payout unit to pay out a quantity of game media corresponding to a predetermined game value, based on the game value received by the receiving unit and results of the game last played on the gaming machine, and when the gaming machine is in the insured game mode, for each individual game played on the gaming machine, subtracts both the game value received by the receiving unit and an insurance premium value required to play a game in the insured game mode from the sum value stored in the memory, adds the game value received by the receiving unit to the net lost game value stored in the memory and subtracts a value, corresponding to the quantity of game media that the payout unit has paid out, from the net lost game value stored in the memory, determines whether the net lost game value stored in the memory has reached an excessive net loss value, and awards an insurance value to the player if the net lost game value stored in the memory has reached the excessive net loss value and, upon awarding of the insurance value, initializes the net lost game value without any input from the player; and when the gaming machine is in the uninsured game mode, for each individual game played on the gaming machine, subtracts the game value received by the receiving unit from the sum value stored in the memory but does not subtract the insurance premium value from the sum value stored in the memory.

12. A gaming machine comprising:

a receiving unit that receives game media as a game value for purchasing games played on the gaming machine;

a payout unit that pays out game media;

a memory storing an owned game value, as a sum value, and a net lost game value that the player has lost;

an operation unit that receives a first operation input that is input by the player;

a card reader that reads information from a membership card issued to a player who is a member of a group, the information read indicating that the player is a member; and a game control unit:

controlling the gaming machine and execution of a game played on the gaming machine, only when the information read from a card by the card reader indicates that the player is a member, permitting switching of the gaming machine between an insured game mode and an uninsured game mode of operation of the gaming machine in response to the first operation input that is input by the player to the operation unit, the insured game mode including a compensation function compensating the player for an excessive net loss incurred in playing the gaming machine and the uninsured game mode not providing the compensation function, wherein the game control unit, initializes the net lost game value when a card is inserted into the card reader and (i) no information is read from the card by the card reader or (ii) the information read from the card by the card reader indicates the player is not a member, controls the payout unit to pay out a quantity of game media corresponding to a predetermined game value, based on the game value received by the receiving unit and results of the game last played on the gaming machine, and when the gaming machine is in the insured game mode, for each individual game played on the gaming machine, subtracts both the game value received by the receiving unit and an insurance premium value required to play a game in the insured game mode from the sum value stored in the memory, adds the game value received by the receiving unit to the net lost game value stored in the memory and subtracts a value, corresponding to the quantity of game media that the payout unit has paid out, from the net lost game value stored in the memory, determines whether the net lost game value stored in the memory has reached an excessive net loss value, and awards an insurance value to the player if the net lost game value stored in the memory has reached the excessive net loss value and, upon awarding of the insurance value, initializes the net lost game value without any input from the player; and when the gaming machine is in the uninsured game mode, for each individual game played on the gaming machine, subtracts the game value received by the receiving unit from the sum value stored in the memory but does not subtract the insurance premium value from the sum value stored in the memory.

* * * * *